US012749920B2

(12) United States Patent
Avestruz et al.

(10) Patent No.: US 12,749,920 B2
(45) Date of Patent: Sep. 29, 2026

(54) SEGMENTED WIRELESS POWER TRANSFER

(71) Applicant: The Regents of the University of Michigan, Ann Arbor, MI (US)

(72) Inventors: Al-Thaddeus Avestruz, Ann Arbor, MI (US); Xin Zan, Ann Arbor, MI (US); Akshay Sarin, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 17/348,644

(22) Filed: Jun. 15, 2021

(65) Prior Publication Data

US 2022/0021243 A1 Jan. 20, 2022

Related U.S. Application Data

(60) Provisional application No. 63/039,151, filed on Jun. 15, 2020.

(51) Int. Cl.
*H02J 50/12* (2016.01)
*H01F 5/04* (2006.01)
*H01F 38/14* (2006.01)

(52) U.S. Cl.
CPC ................ *H02J 50/12* (2016.02); *H01F 5/04* (2013.01); *H01F 38/14* (2013.01)

(58) Field of Classification Search
None
See application file for complete search history.

(56) References Cited

U.S. PATENT DOCUMENTS

| | | | | |
|---|---|---|---|---|
| 9,899,138 B1 * | 2/2018 | Lu | H02J 7/00712 | |
| 2009/0067207 A1 * | 3/2009 | Nishino | B60L 5/005 | 363/126 |
| 2015/0022147 A1 * | 1/2015 | Jung | H01F 38/14 | 320/108 |
| 2016/0181875 A1 * | 6/2016 | Long | H02J 50/12 | 320/108 |
| 2016/0254755 A1 * | 9/2016 | Deboy | H02M 3/33546 | 363/21.02 |
| 2018/0351391 A1 * | 12/2018 | Park | B60L 53/66 | |

(Continued)

FOREIGN PATENT DOCUMENTS

WO WO-2013122703 A1 * 8/2013 ............ B60L 11/182

OTHER PUBLICATIONS

Chu et al., "Transfer-Power Measurement: A Non-Contact Method for Fair and Accurate Metering of Wireless Power Transfer in Electric Vehicles", IEEE 18th Workshop on Control and Modeling for Power Electronics (COMPEL), Stanford, CA, 8 pages, 2017.

(Continued)

*Primary Examiner* — Daniel Kessie
(74) *Attorney, Agent, or Firm* — Lempia Summerfield Katz LLC

(57) ABSTRACT

A device for wireless power transfer includes a segmented coil comprising a plurality of coil segments, each adjacent pair of coil segments of the plurality of coil segments being separated from one another by a respective passive element, and a plurality of constituent converters coupled to the segmented coil, each constituent converter of the plurality of constituent converters being coupled to a respective coil segment of the plurality of coil segments to drive the respective coil segment.

28 Claims, 19 Drawing Sheets

(56) References Cited

U.S. PATENT DOCUMENTS

| | | | | |
|---|---|---|---|---|
| 2019/0013699 A1 | 1/2019 | Avestruz et al. | | |
| 2019/0013703 A1* | 1/2019 | Shichino | ................. | H02J 50/12 |
| 2019/0089199 A1* | 3/2019 | Hosotani | ................. | H02J 50/10 |
| 2019/0190319 A1* | 6/2019 | Kawamae | ............... | H02M 7/46 |
| 2020/0014247 A1* | 1/2020 | Avestruz | ................. | H02J 50/12 |

OTHER PUBLICATIONS

Lu et al., "Paralleling GaN E-HEMTs in 10kW-100kW Systems", IEEE Applied Power Electronics Conference and Exposition (APEC), Tampa, FL, 8 pages, 2017.

Waffenschmidt et al., "Limitation of Inductive Power Transfer for Consumer Applications", 13th European Conference on Power Electronics and Applications, Barcelona, Spain, 10 p. 2009.

A. Knott, T. M. Andersen, P. Kamby, J. A. Pedersen, M. P. Madsen, M. Kovacevic, and M. A. E. Andersen; Evolution of very high frequency power supplies; IEEE Journal of Emerging and Selected Topics in Power Electronics, vol. 2, No. 3; 2013; 11 pp.

A. L. F. Stein, p. A. Kyaw, and C. R. Sullivan; Figure of merit for resonant wireless power transfer; 2017 IEEE 18th Workshop on Control and Modeling for Power Electronics (COMPEL), Jul. 2017, pp. 1-8.

A. Sarin and A. Avestruz; Scaling wireless power transfer through code division multiple access; 2018 IEEE PELS Workshop on Emerging Technologies: Wireless Power Transfer (Wow), Jun. 2018, pp. 1-6.

A. Sarin, X. Cui, and A. Avestruz; Comparison of switched receivers for direct-sequence spread-spectrum wireless power transfer; 2017 IEEE 18th Workshop on Control and Modeling for Power Electronics (COMPEL), Jul. 2017, pp. 1-8.

A. Sepahvand, A. Kumar, K. Afridi, and D. Maksimovic; High power transfer density and high efficiency 100 MHz capacitive wireless power transfer system; 2015 IEEE 16th Workshop on Control and Modeling for Power Electronics (COMPEL), Jul. 2015, pp. 1-4.

C. Chen, T. Chu, C. Lin, and Z. Jou; A study of loosely coupled coils for wireless power transfer; IEEE Transactions on Circuits and Systems II: Express Briefs, vol. 57, No. 7, pp. 536-540, Jul. 2010.

D. J. Perreault et al., "Opportunities and challenges in very high frequency power conversion" in 2009 Twenty-Fourth Annual IEEE Applied Power Electronics Conference and Exposition. IEEE, 2009, pp. 1-15.

D. J. Perreault; A new power combining and outphasing modulation system for high-efficiency power amplification; IEEE Transactions on Circuits and Systems I: Regular Papers, vol. 58, No. 8; Aug. 2011; 15 pp.

G. Systems; GaN Transistors 650 V E-HEMT; Available: https://gansystems.com/gan-transistors/; 2018; 3 pp.

G. Zulauf, S. Park, W. Liang, K. N. Surakitbovorn, and J. Rivas-Davila; Coss losses in 600 V GaN power semiconductors in soft-switched, high- and very-high-frequency power converters; IEEE Transactions on Power Electronics, vol. 33, No. 12, pp. 10748-10763, Dec. 2018.

I. Aoki, S. D. Kee, D. B. Rutledge, and A. Hajimiri; Fully integrated CMOS power amplifier design using the distributed active-transformer architecture; IEEE Journal of Solid-State Circuits, vol. 37, No. 3, pp. 371-383, Mar. 2002.

J. A. Santiago-Gonzlez, K. M. Elbaggari, K. K. Afridi, and D. J. Perreault; Design of class E resonant rectifiers and diode evaluation for vhf power conversion; IEEE Transactions on Power Electronics, vol. 30, No. 9, Sep. 2015; 14 pp.

J. M. Rivas, D. Jackson, O. Leitermann, A. D. Sagneri, Y. Han, and D. J. Perreault; Design considerations for very high frequency dc-dc converters; 2006 37th IEEE Power Electronics Specialists Conference, Jun. 2006, pp. 1-11.

R. C. N. Pilawa-Podgurski, A. D. Sagneri, J. M. Rivas, D. I. Anderson, and D. J. Perreault; Very-high-frequency resonant boost converters, IEEE Transactions on Power Electronics; vol. 24, No. 6; Jun. 2009; 8 pp.

S. Aldhaher, D. C. Yates, and p. D. Mitcheson; Load- independent class E/EF inverters and rectifiers for MHz-switching applications; IEEE Transactions on Power Electronics, vol. 33, No. 10, pp. 8270-8287, Oct. 2018.

S. C. Tang, T. L. T. Lun, Z. Guo, K. Kwok, and N. J. McDannold; Intermediate range wireless power transfer with segmented coil transmitters for implantable heart pumps; IEEE Transactions on Power Electronics, vol. 32, No. 5, pp. 3844-3857, May 2017.

S.C. Tang, N.J. McDonald; Power Loss Analysis and Comparison of Segmented and Unsegmented Energy Coupling Coils for Wireless Energy Transfer; IEEE Journal of Emerging and Selected Topics in Power Electronics, vol. 3, No. 1, Mar. 2015; 11 pp.

X. Zan and A. Avestruz; Performance comparisons of synchronous and uncontrolled rectifiers for 27.12 MHz wireless power transfer using CMCD converters; 2018 IEEE Energy Conversion Congress and Exposition (ECCE), Sep. 2018, pp. 2448-2455.

X. Zan and A. Avestruz; Wireless power transfer for implantable medical devices using piecewise resonance to achieve high peak-to-average power ratio; 2017 IEEE 18th Workshop on Control and Modeling for Power Electronics (COMPEL), Jul. 2017, pp. 1-8.

X. Zan and A.-T. Avestruz, "27.12 MHz bi-directional wireless power transfer using current-mode class d converters with phase-shift power modulation" in 2018 IEEE PELS Workshop on Emerging Technologies: Wireless Power Transfer (Wow). IEEE, 2018, pp. 1-6.

* cited by examiner (a) Conventional segmentation.

(b) Active or passive segmentation.

(b) Singleton transmitter when $S_1$ ON and $S_2$ OFF.

(a) Singleton transmitter when $S_1$ OFF and $S_2$ ON.

(b) Active or passive segmented converter when $S_1$ ON and $S_2$ OFF.

(a) Active or passive segmented converter when $S_1$ OFF and $S_2$ ON.

(a) Active segmentation and conventional segmented coil wireless power transfer.

(b) Singleton wireless power transfer.

SEGMENTED WIRELESS POWER TRANSFER

CROSS-REFERENCE TO RELATED APPLICATION

This application claims the benefit of U.S. provisional application entitled "Segmented Wireless Power Transfer," filed Jun. 15, 2020, and assigned Ser. No. 63/039,151, the entire disclosure of which is hereby expressly incorporated by reference.

BACKGROUND OF THE DISCLOSURE

Field of the Disclosure

The disclosure relates generally to wireless power transfer.

Brief Description of Related Technology

The performance of magnetically-coupled wireless power transfer (WPT) systems can be quantified by Q·k, the product of the quality factor of the coils and the coupling coefficient. This figure of merit determines the maximum system efficiency, with k determining the power transferred. However, for power transfer at long distances with small receivers, which is prevalent in many applications, the product Q·k is dramatically decreased because of a small coupling coefficient k.

The quality factor Q of the coils can be drastically increased by operating at VHF (very-high-frequency). An air-core inductor has a quality factor that monotonically increases with frequency. Unfortunately, VHF power conversion presents challenges, which include a power-frequency tradeoff that is endemic in devices and manifested in FIG. 1.

The coupling coefficient k, which decreases with distance, can be improved by a larger transmitter coil. Small receivers with large transmitter coils as a use case are prevalent in implantable medical devices, RFID, infrastructure sensors, IoT, and consumer devices.

GaN high electron mobility transistors (HEMTs) are used for VHF power conversion because power capability is higher for a given parasitic capacitance Coss. Unfortunately, the maximum operating frequency is limited by Coss, the lower bound of the resonating capacitance. As shown in FIG. 2, the relationship between the maximum current rating $I_{max}$, which is an indicator of power capability, and the reciprocal of parasitic drain-to source capacitance Coss is nearly inversely proportional.

With VHF operation and GaN HEMTs, the Q·k product can be improved by improving Q, but power limitations nonetheless remain. This is further exacerbated by the small k from long transfer distances and small receivers. Increasing voltage will increase power, but will incur higher $C_{oss}$ loss and difficulties with safety. Higher voltage devices with small $C_{oss}$ will have higher channel resistance and hence lower $I_{max}$. At higher power, the current rating may be exceeded. Parallel devices may be used to increase the current handling, but the higher $C_{oss}$ will decrease the maximum operating frequency.

SUMMARY OF THE DISCLOSURE

In accordance with one aspect of the disclosure, a device for wireless power transfer includes a segmented coil including a plurality of coil segments, each adjacent pair of coil segments of the plurality of coil segments being separated from one another by a respective passive element, and a plurality of constituent converters coupled to the segmented coil, each constituent converter of the plurality of constituent converters being coupled to a respective coil segment of the plurality of coil segments to drive the respective coil segment.

In accordance with another aspect of the disclosure, a system for wireless power transfer includes a transmitter device and a receiver device. The transmitter device, the receiver device, or both the transmitter device and the receiver device includes a segmented coil including a plurality of coil segments, each adjacent pair of coil segments of the plurality of coil segments being separated from one another by a respective capacitance, and a plurality of constituent converters coupled to the segmented coil, each constituent converter of the plurality of constituent converters being coupled to a respective coil segment of the plurality of coil segments to drive the respective coil segment.

In accordance with yet another aspect of the disclosure, a transmitter for wireless power transfer includes a segmented coil including a plurality of coil segments, each adjacent pair of coil segments of the plurality of coil segments being separated from one another by a respective capacitance, and a plurality of constituent converters coupled to the segmented coil, each constituent converter of the plurality of constituent converters being coupled to a respective coil segment of the plurality of coil segments to drive the respective coil segment. Each constituent converter of the plurality of converters includes a pair of switches and a plurality of passive components coupling the pair of switches to the coil segment.

In accordance with yet another aspect of the disclosure, a receiver for wireless power transfer includes a segmented coil including a plurality of coil segments, each adjacent pair of coil segments of the plurality of coil segments being separated from one another by a respective capacitance, and a plurality of constituent converters coupled to the segmented coil, each constituent converter of the plurality of constituent converters being coupled to a respective coil segment of the plurality of coil segments to drive the respective coil segment. Each constituent converter of the plurality of converters includes a pair of switches and a plurality of passive components coupling the pair of switches to the coil segment.

In connection with any one of the aforementioned aspects, the devices and/or methods described herein may alternatively or additionally include or involve any combination of one or more of the following aspects or features. Each passive element includes a capacitance. Each passive element includes an inductance. Each passive element includes a combination of capacitances and inductances. Each constituent converter of the plurality of converters is configured as a current-mode, Class D converter. Each coil segment of the plurality of coil segments is driven by a respective constituent converter of the plurality of constituent converters. The plurality of constituent converters have an identical configuration. The plurality of constituent converters are controlled to provide an equal amount of power to the segmented coil. The plurality of constituent converters are controlled to provide different amounts of power to the segmented coil to spatially shape/direct the wireless power transfer. The plurality of constituent converters are controlled to provide different phase angle of power to the segmented coil to spatially shape and/or direct the wireless power transfer. Each constituent converter of the plurality of converters includes a plurality of switches and a plurality of passive components coupling the plurality of switches to the coil segment. Each switch of the plurality of switches is ground-referenced. The plurality of switches includes a first switch and a second switch. The first switch and the second switch are controlled by complementary switch control signals. Each switch of the plurality of switches includes a high electron mobility transistor (HEMT). The plurality of passive components and the respective capacitance are configured to act as a filter such that the segmented coil is driven at a frequency of the wireless power transfer. The plurality of passive components includes a plurality of choke inductors, each choke inductor of the plurality of choke inductors acting as a switched current source with a respective switch of the plurality of switches. Each constituent converter of the plurality of converters is configured as a current-mode, Class D converter. Each coil segment of the plurality of coil segments is driven by a respective constituent converter of the plurality of constituent converters. Each constituent converter of the plurality of converters includes a plurality of switches and a plurality of passive components coupling the plurality of switches to the coil segment. Each switch of the plurality of switches is ground-referenced. The plurality of switches includes a first switch and a second switch. The first switch and the second switch are controlled by complementary switch control signals. The pair of switches are controlled by complementary switch control signals. Each constituent converter of the plurality of converters is configured as a current-mode, Class D converter. Each coil segment of the plurality of coil segments is driven by a respective constituent converter of the plurality of constituent converters.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
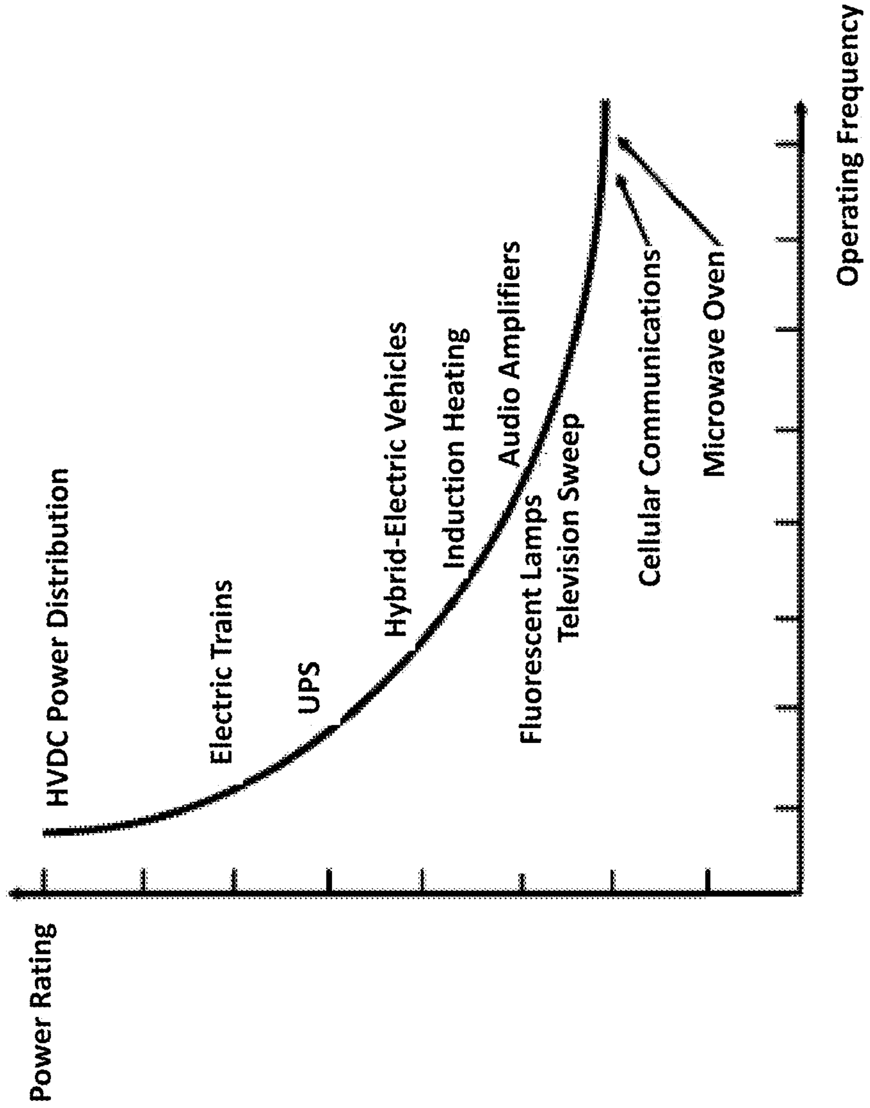
FIG. 1 depicts a graphical plot of power rating relative to system operating frequency of a number of examples of power semiconductor devices in different applications.
Figure 2:
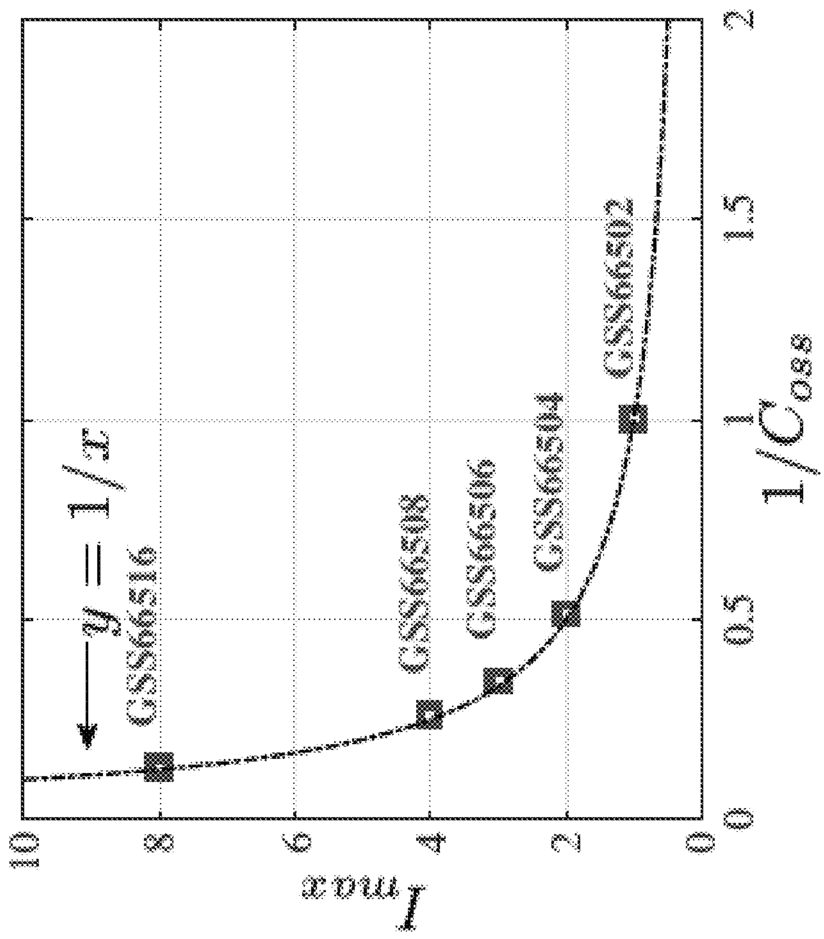
FIG. 2 depicts a graphical plot of drain current ($I_{max}$), which is commensurate with power level, relative to parasitic capacitance ($C_{oss}$), which corresponds to the operating frequency, for a number of examples of GaN high electron mobility transistors (HEMTs).

The embodiments of the disclosed devices and systems may assume various forms. Specific embodiments are illustrated in the drawing and hereafter described with the understanding that the disclosure is intended to be illustrative. The disclosure is not intended to limit the invention to the specific embodiments described and illustrated herein.

DETAILED DESCRIPTION OF THE DISCLOSURE

Devices, systems, and methods for segmented wireless power transfer are described. The disclosed devices, systems, and methods may use an active or passive segmentation architecture. The segmentation architecture includes multiple constituent converters, or modules. The disclosed devices and systems are configured to combine the output power from the multiple constituent converters, or modules. Each converter module may be smaller and more optimally designed. The combination of multiple converter modules helps to circumvent the device limitations of wireless power transfer at very high frequencies (VHF).

In some cases, the disclosed devices include multiple identical primitive, or constituent, converters. Each converter may provide a module of the device. Each primitive or modular converter may include respective electronic, magnetic, and control components. These components may be identically configured.

In operation, all the modules may operate identically at the same time, in some cases. In other cases, the modules may be operated differently to, for instance, spatially shape or direct the transfer power. Such spatial shaping may be useful in connection with, for instance, misalignment of a transmitter and a receiver.

The disclosed devices and systems may be scalable by increasing the number of modules. For example, power may be increased by adding more primitive/modular converters with the same efficiency of each primitive/modular converter. Transfer distance may be increased by adding more identical primitive/modular with larger inductance coil. High-frequency and very-high-frequency operation may nonetheless be achieved due to the miniaturization the switches and other electronics of each module.

The disclosed devices and systems may be used to attain wireless power transfer at long distances with small receivers. The disclosed devices and systems combine coil segmentation with multiple primitive converters (e.g., operating at VHF) and parallel switches to increase power and efficiency.

The disclosed devices and systems may be useful in connection with a wide variety of applications. For instance, the wireless power transfer provided by the disclosed devices and systems is useful in connection with lightweight unmanned aerial vehicles (UAVs) and various types of robots (e.g., agile robots). In those and other cases, the wireless power transfer is useful for supporting long transfer distances, providing tolerance to misalignment, and high power with light weight.

Figure 3:
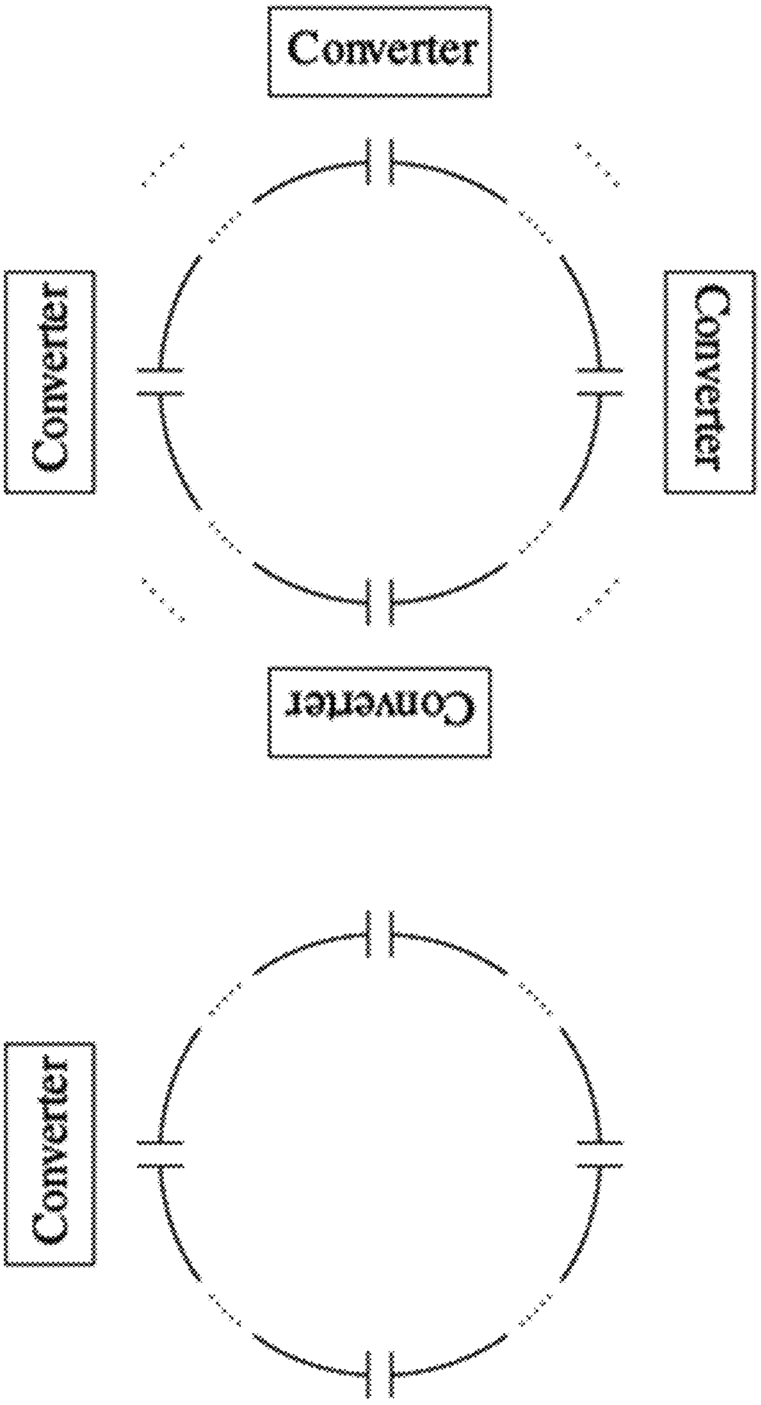
FIG. 3 depicts schematic views of transfer coil segmentation in accordance with a conventional approach and in accordance with one example of the disclosed devices and systems.

For wireless power transfer (WPT), segmenting the coils is a way to generate more flux in a physically larger transmitter coil (larger k and hence more power) without an increase in terminal voltage at each segment. Segmentation may be implemented via the distribution of discrete capacitors, as illustrated in FIG. 3(*a*). One shortcoming of this conventional approach to segmentation is the potentially high switch current stress at high power.

The disclosed devices and systems circumvent the difficulties in driving a large transmitter coil by also segmenting the power conversion. The active segmentation of the disclosed devices and systems, schematically shown in FIG. 3(*b*), helps with both Q and k in the Q·k product, especially at high frequency and very high frequency operation, improving both the power and efficiency of long distance wireless power transfer with small receivers. In conventional segmentation, as shown in FIG. 3(*a*), the segmented coil is driven by a single converter or power amplifier. In the active or passive segmentation of the disclosed devices and systems, multiple converters are used to drive the segmented coil, partitioning the current stress and the voltage stress, and hence power. The segmented coil and its driving converters can be regarded as an aggregate power converter, which may be referenced herein as an active or passive segmented power converter.

Described herein are examples of VHF active segmented power converters using four current-mode class D (CMCD) converters as the primitive or constituent converters. Each constituent converter of the disclosed devices and systems may have one or more aspects configured similarly to those in cell phone power amplifiers. Singular CMCD converters (singletons) are well suited for HF (high-frequency) and VHF (very-high-frequency) power conversion because of ground-referenced switches.

Although described in connection with VHF examples, the disclosed devices and systems are not limited to VHF power conversion. However, the active or passive segmentation of the disclosed devices and systems may be used across a wide range of applications having various operating frequencies. For instance, these applications may be in the UHF or microwave frequency ranges. The disclosed devices and systems are also not limited to CMCD converters, but rather can be applied to a broad range of primitives, or constituent converters operating at any frequency.

In some cases, the operation of the disclosed devices and systems, including, for instance, the active segmented CMCD power converter, relies on the primitive or constituent converters operating identically and synchronously. This aspect of the architecture of the disclosed devices and systems provides, for example: (i) an increase in the Q·k product through both Q and k by VHF operation and segmentation; (ii) an increase in the transfer distance with higher power and efficiency through VHF operation and segmentation; (iii) an increase in the power without increasing the voltage level, which benefits device selection and safety; (iv) a sharing of the power and current stress among primitive converters without increasing device parasitics in contrast to solely parallel switches, resulting in a higher power-frequency product; and (v) a design with identical primitive converters, which scales in power and preserves each primitive's efficiency.

In other cases, the primitive or constituent converters are not operated identically or synchronously. For instance, the switch control waveforms for the constituent converters may be phase-shifted or otherwise configured differently relative to one another for spatial shaping or power balance/imbalance of the wireless power transfer. In another instance, the drain or other (e.g., DC) voltages of the constituent converters may be different relative to one another also for the purposes of spatial shaping. In some cases, zero voltage duration, when the switches are both on, may be different for spatial shaping or power balance/imbalance. In some cases, duty cycles may be different for spatial shaping or power balance/imbalance. In some cases, the coupling to the segmented coils may be different for spatial shaping or power balance/imbalance. Spatial shaping may constitute the shaping in space of the electric, magnetic, or electromagnetic fields in magnitude and/or phase.

Set forth below are details regarding the circuit operation of several examples of the disclosed devices and systems. A number of aspects of the active segmentation of the disclosed devices and systems are also compared to other techniques. Finally, a hardware example of a 100 MHz inductive wireless power transfer system using a commercial power device EPC 2038 is described. The example achieved an approximate efficiency of 74% and 12 W ac load power including the gating loss.

The VHF active segmentation of the disclosed devices and systems increases the Q·k product by increasing both Q and k through VHF operation and enlarging the physical size of the transmitter coil. Flux is aggregated from each inductor segment that is part of a primitive converter, together combining to form a large transmitter coil. Higher power-frequency product and lower device current rating is achieved in comparison to conventional segmentation.

Figure 4:
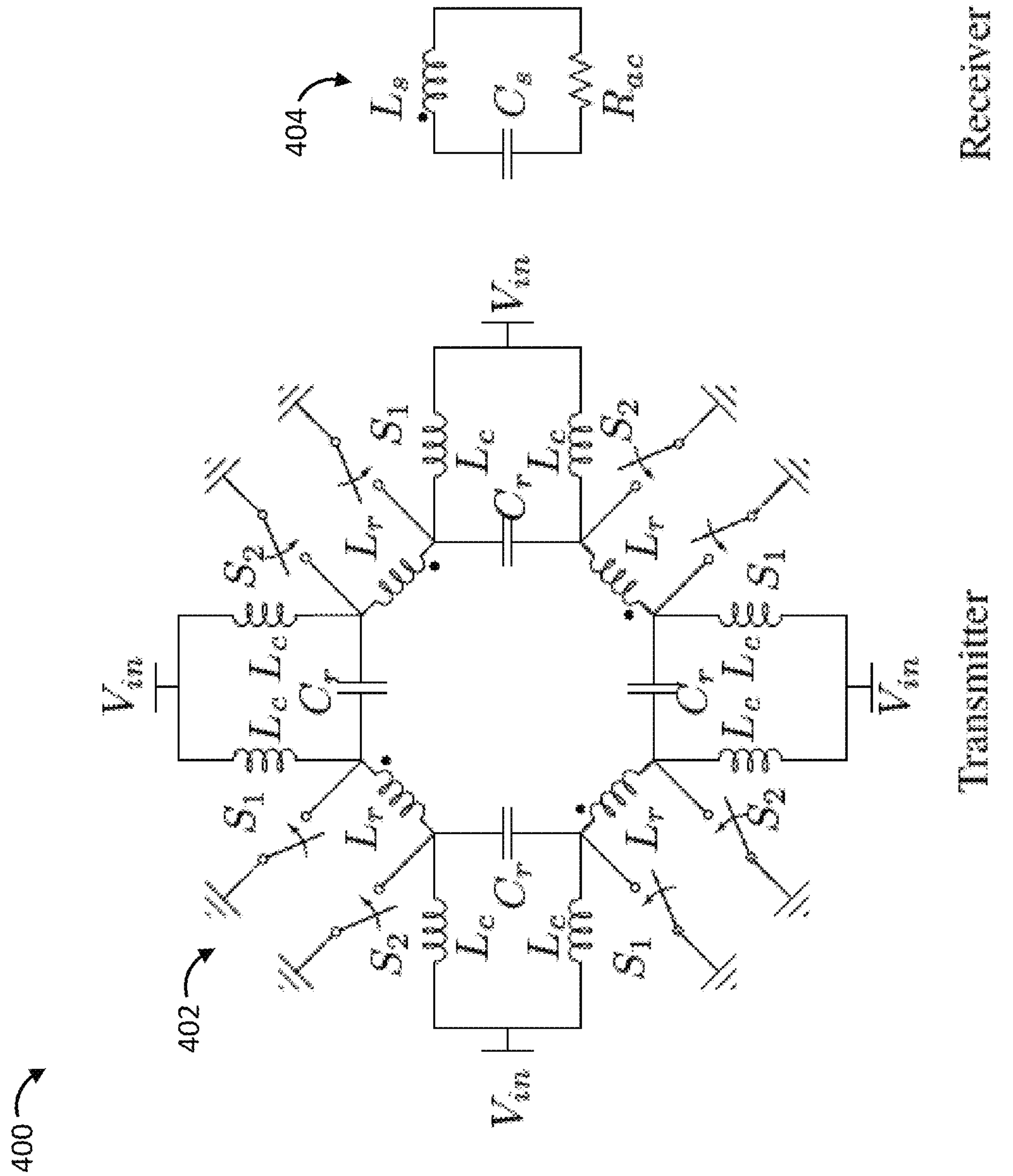
FIG. 4 is a schematic view of an active segmented wireless power transfer system having an active segmented transmitter in accordance with one example.

FIG. 4 depicts a VHF active segmented wireless power transfer system 400 in accordance with one example. In this example, a transmitter 402 of the system 400 is or includes an active segmented wireless power transfer coil, which is actively driven by four primitive CMCD converters. In this example, a receiver 404 of the system 400 is or includes a series resonant network with the receiver coil coupling uniformly to the transmitter coil.

Other types of receivers may be used, including, for instance, various types of switched receivers. Examples of switched receivers are described in U.S. Patent Publication No. 2019/0013699 ("Switched Receiver for Wireless Power Transfer"), the entire disclosure of which is hereby incorporated by reference. In other examples, the receiver may be or otherwise include an active or passive segmented wireless power transfer device. For instance, the transmitter and the receiver of the wireless power transfer system may be configured and operated as bidirectional transceivers, as described in the above-referenced publication.

The wireless power transfer system may include any number of transmitters and any number of receivers. The transmitters may or may not be identically configured. The receivers may or may not be identically configured.

Figure 5:
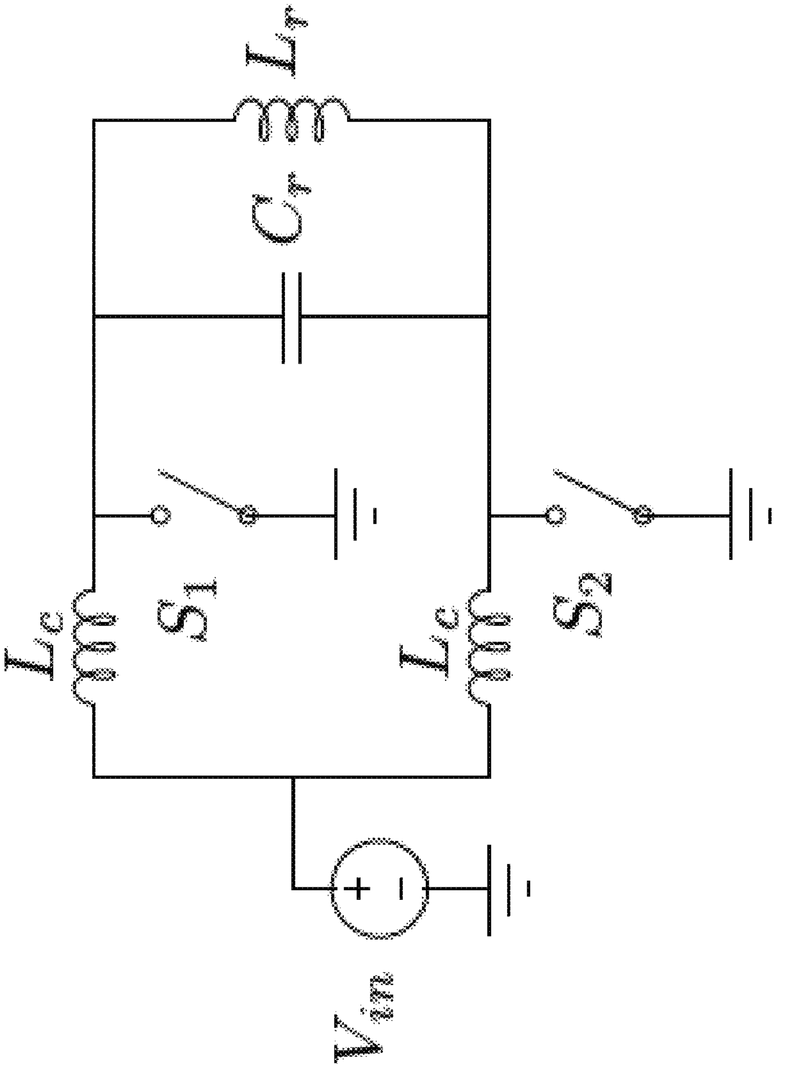
FIG. 5 is a schematic view of a primitive or constituent converter component of an active segmented transmitter device in accordance with one example.
Figure 6:
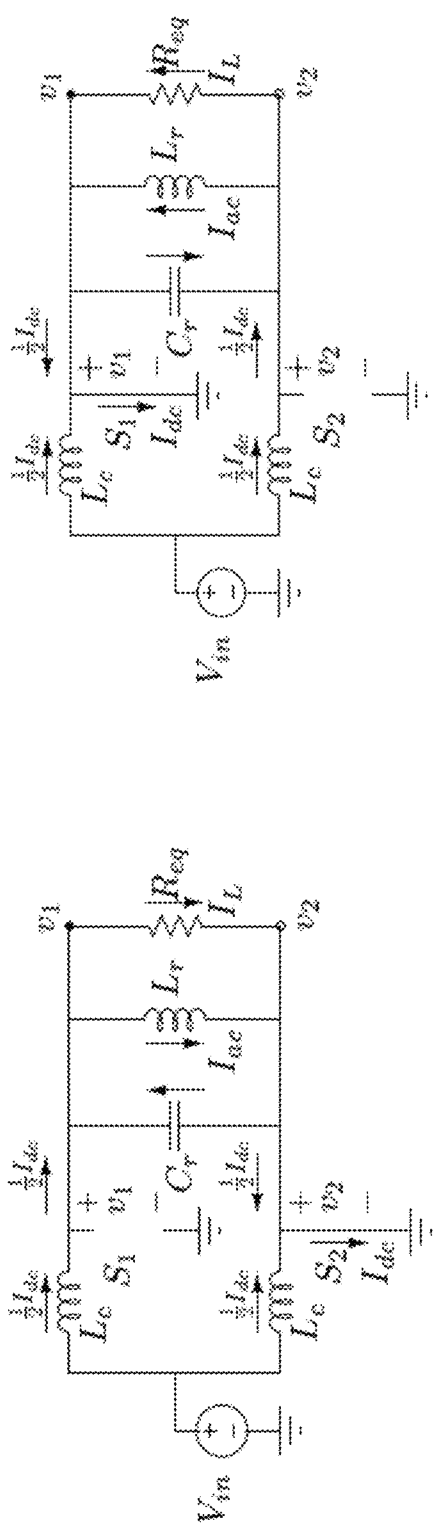
FIG. 6 depicts schematic views of a singleton transmitter, or constituent converter component of an active segmented transmitter device, during operation in accordance with one example.

The active segmented transmitter 402 of the example of FIG. 4 includes multiple primitive or constituent converters. The primitive or constituent converter is the basic module of the active segmented power converter. In this example, each primitive or constituent converter is a single open-load current-mode class D (CMCD) converter, an example of which is shown in FIG. 5. Each primitive or constituent converter may be identical to a singleton CMCD transmitter, an example of which is shown in FIG. 6.

Switches S1 and S2 of each constituent converter may be complementary switches, switching the dc current converts by choke inductor $L_c$ from a DC voltage source. The switches may flow the total DC current when they are on. The current flow through the RLC resonant tank may be a square-wave current with amplitude of half the DC current. In some instances, there may be an overlap in the operation of S1 and S2. For example, this overlap in the operation may constitute S1 and S2 simultaneously on for specified period of time.

With complementary switching sequences between switches S1 and S2 and dc current enforced by choke inductor $L_c$, an LCR parallel resonant tank may filter out the high-order harmonics of the square-wave current flowing into the resonant tank and keeps the fundamental-frequency current $I_L$ flowing through resistance $R_{eq}$, which equivalently represents the wireless power transfer receiver. The switching strategy and current distribution, which may be identical for both the singleton and primitives, are shown in FIG. 6(*a*) when the even switch S2 is ON and, in FIG. 6(*b*) when the odd switch S1 is ON. The current flow through the resonant inductor and capacitor may be expressed as follows.

$$I_{ac} = Q_L I_L + \frac{V_p}{\omega L_r}, \quad (1)$$

where $Q_L$ is the quality factor of the tank ($L_r$, $C_r$, and $R_{eq}$) and $V_p$ is the peak value of the switch drain voltages $v_1$ and $v_2$. The differential voltage across $R_{eq}$ is a sine wave, which is the difference between the voltages $v_1$ and $v_2$. Here, the inductor $L_r$ already includes the effect of the coupling coefficient of the wireless power transfer system into account. The operating frequency may be expressed approximately as follows.

$$\omega = \frac{1}{\sqrt{L_r(C_{sw} + C_r)}} \quad (2)$$

with $L_c \gg L_r$ and high $Q_L$. The capacitance $C_{sw}$ is the parallel switch capacitance.

For each primitive converter in FIG. 4, the effective switch capacitance $C_{sw}$, which includes $C_{oss}$, has been absorbed into the local resonant capacitance $C_r$. The series and parallel combination of the loop provides a segmented coil for combination with the multiple primitive converters actively driving the resonant components.

Figure 19:
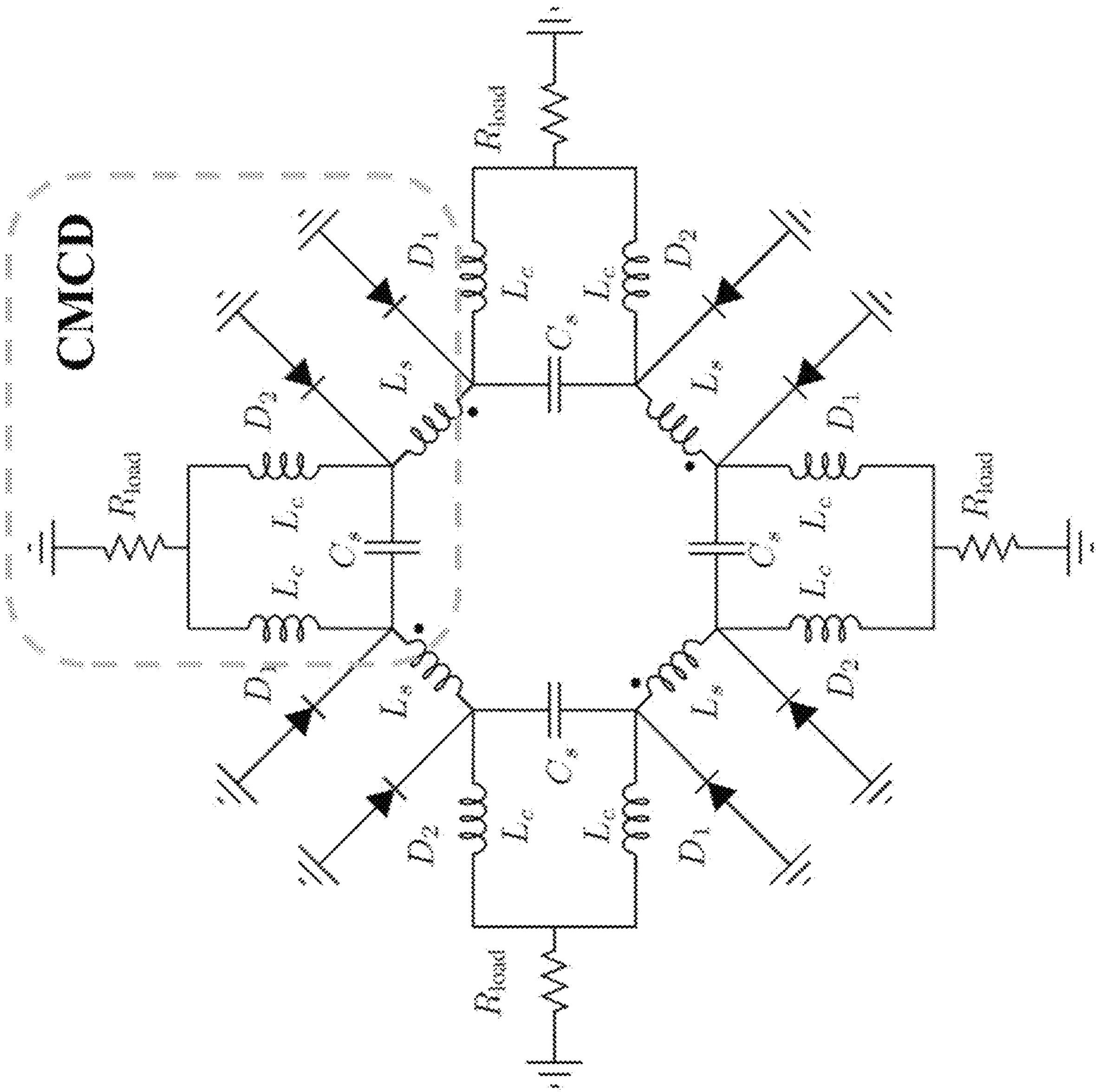
FIG. 19 is a schematic view of a passive segmented converter wireless power transfer device having passive switches (e.g., diodes) in accordance with an example.

In other cases, one or more of the coil segments does not have a primitive converter directly driving the resonant components of the coil segment. For instance, the coil may include four segments, and only two primitive converters. Two of the segments are directly driven by one of the primitive converters. The other two segments may have no converter, an idle converter, or a different type of converter. For instance, the other two segments may include only passive devices and are indirectly driven. In some cases, the passive circuitry coupled to the indirectly driven segments includes diodes instead of the actively driven switches, e.g., the switches S1 and S2. An example of a passive segmented device is shown in FIG. 19.

Figure 7:
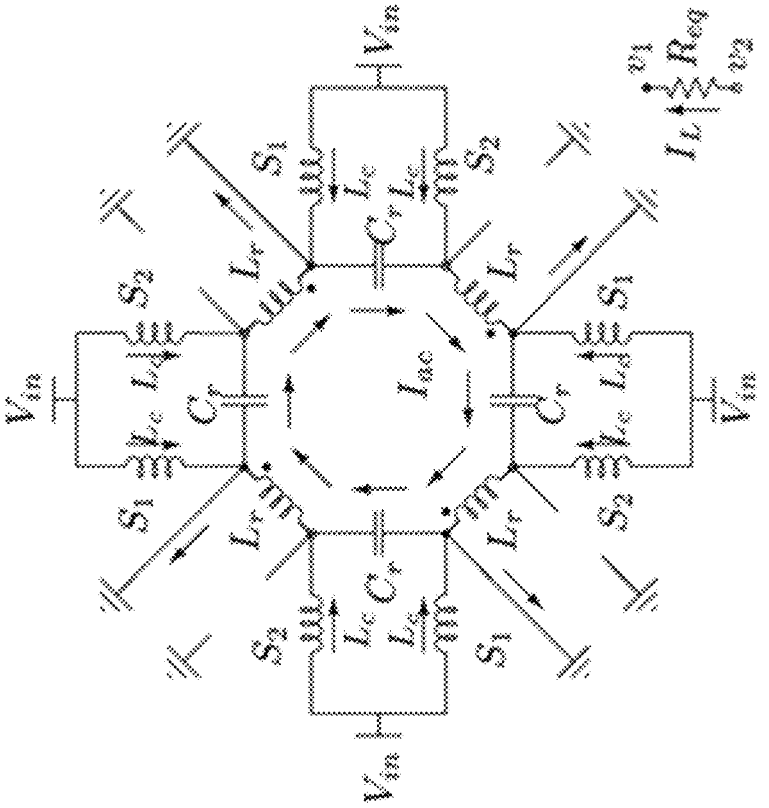
FIG. 7 depicts schematic views of an active or passive segmented converter wireless power transfer device during operation in accordance with one example.
Figure 7:
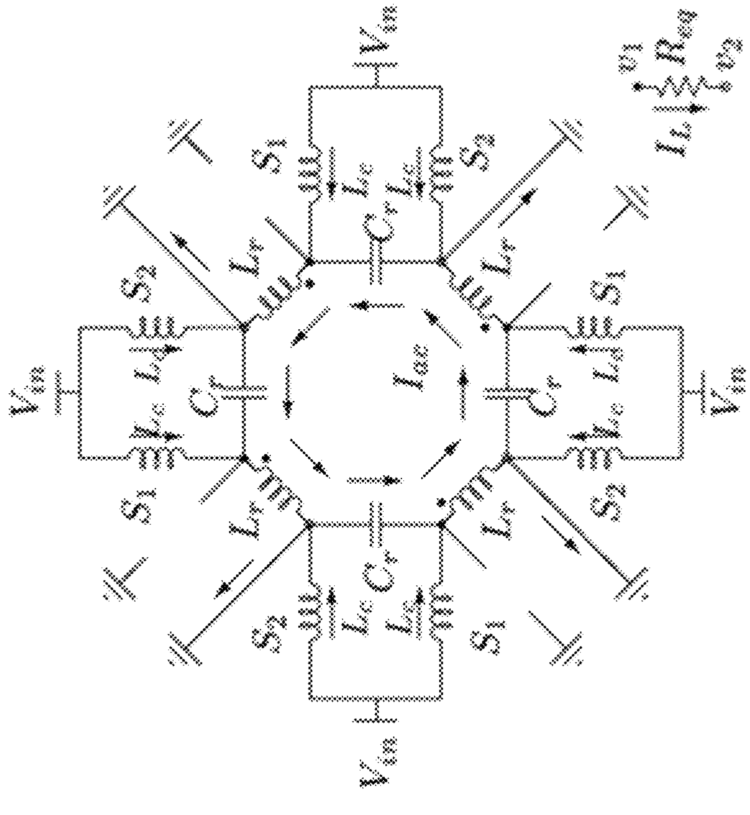

Further details regarding the operation of an active segmented transmitter in accordance with one example are now set forth. In some cases, the active segmented power converter relies on primitive converters operating identically and synchronously. In the example of an active segmented CMCD power converter shown in FIG. 7, there are eight switches in the four primitive CMCD converters. The four odd (S1) and four even (S2) switches are driven separately by two out-of-phase square waves (e.g., with a desired duty cycle), which is analogous to switch S1 and S2 in the singleton CMCD converter shown in FIG. 6. Thus, similar to FIG. 6, the switching strategy and loop current distribution $I_{ac}$ may be regarded as a combination from four primitive converters, shown in FIG. 7(*a*) when the four even switches S2 are ON and alternately in FIG. 7(*b*) when the four odd switches S1 are ON.

In this example, the active segmented transmitter may be configured to operate as a singleton CMCD converter. For instance, the switch voltage may be a half sine wave when the switch is OFF. The switch carries all the dc current for its primitive module when the switch is ON. Thus, the voltages are congruent in magnitude and phase among odd nodes ($v_1$) and congruent among even nodes ($v_2$). The loop current $I_{ac}$ is at the operating frequency. In other words, the switching frequency of switches S1 and S2 is the resonant frequency of $L_r$ and $C_r$, which may be expressed as follows.

$$\omega = \frac{1}{\sqrt{L_r C_r}} \quad (3)$$

where $L_r$ and $C_r$ have taken the coupling coefficient and switch capacitance into account. The loop current may be expressed as follows.

$$I_{ac} = \frac{V_p}{\omega L_r} = \omega C_r V_p, \quad (4)$$

The loop current, which has the same value as in expression (1), generates a magnetic field, where $V_p$ is the peak drain voltage of the switches S1 and S2. The flux linkage equals the magnetic flux generated by the loop current as follows.

$$\lambda = 1 \cdot \Phi = 4 \times L_r I_{ac} = \frac{4 \times V_p}{\omega}, \tag{5}$$

which is a factor of 4 compared with the flux linkage of a singleton system, where the following expression applies.

$$\lambda = 1 \cdot \Phi = L_r I_{ac} = \frac{V_p}{\omega}. \tag{6}$$

The operation of the active segmented transmitter is equivalent to having a singleton CMCD wireless power transfer system with four times the voltage stress in expression (6) for the same transmitter flux in expression (5).

A series resonant network receiver may be used to illustrate and demonstrate the operation of the VHF active segmented CMCD transmitter. The series resonant network may present a resistive load $R_{ac}$. A number of rectifier loads may be used instead. For example, a CMCD rectifier and variations thereof with parallel resonance, or a class E rectifier and variations thereof with series resonance may be used. Still other types of receivers may be used, including various types of switched receivers and a receiver configured with active segmentation as described herein.

Figure 8:
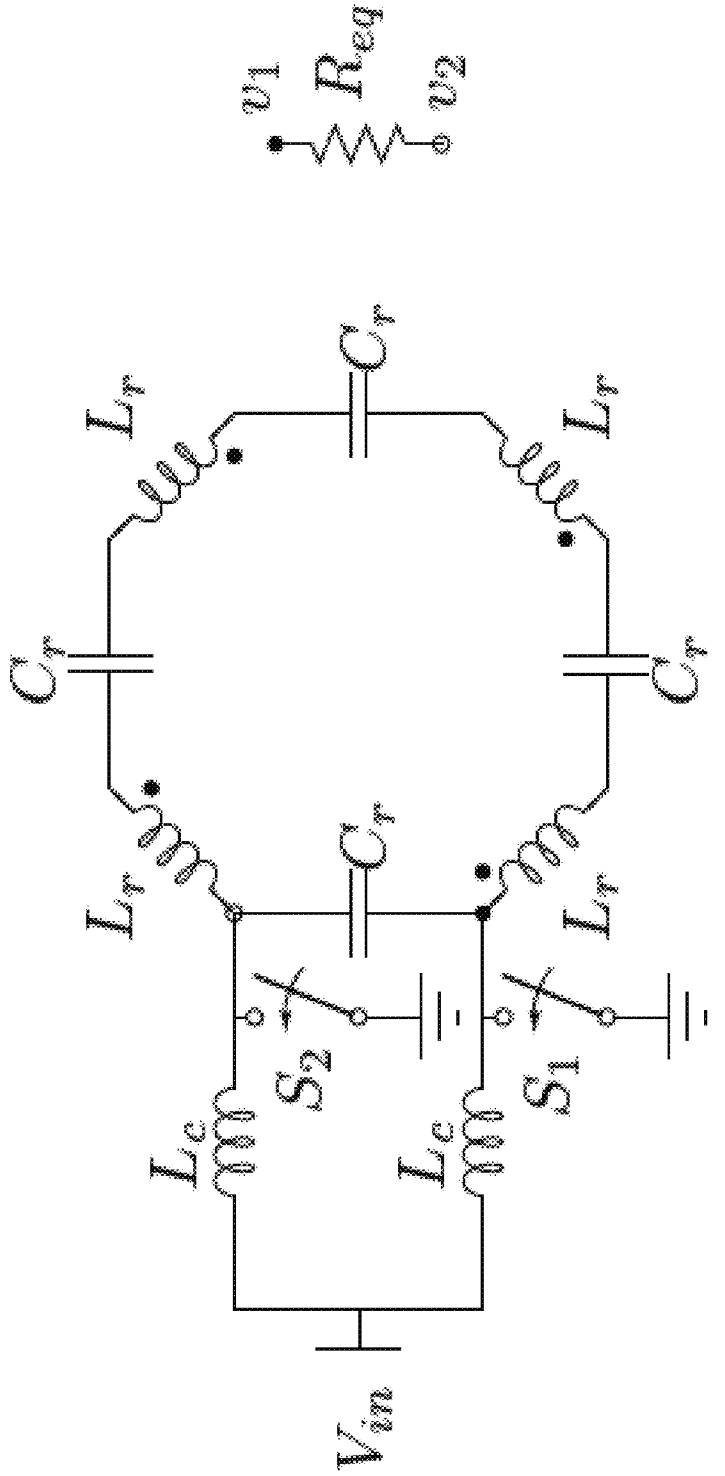
FIG. 8 is a schematic view of a conventional segmented coil wireless power transfer device.

One or more aspects of the active segmentation of the disclosed devices and systems involves a combination of features from other methods, including a singleton CMCD transmitter, an example of which is shown in FIG. 6, a conventional segmented coil transmitter, an example of which is shown in FIG. 8, and potentially parallel switches. It is worthwhile to examine how these other methods contribute to improving the Q·k figure of merit in wireless power transfer. In this analysis, the power and efficiency of the receiver are held constant. The receiver is a series resonant network $L_s$, $C_s$, and $R_{ac}$ with equivalent coupling coefficients to the transmitter coil.

As mentioned above, the switch capacitance $C_{sw}$ can be absorbed into capacitance $C_r$ in the singleton CMCD transmitter. Similarly, the switch capacitance $C_{sw}$ can be absorbed into the primitive capacitance $C_r$ in the active segmented transmitter. For the conventional segmented coil converter, the explicit capacitance $C_r$ in the driven side may be less than the explicit capacitance $C_r$ in other segments because of the additional capacitance $C_s$, from the switches in the power converter. Zero voltage switching may be provided when the resonant components are selected appropriately.

Figure 9:
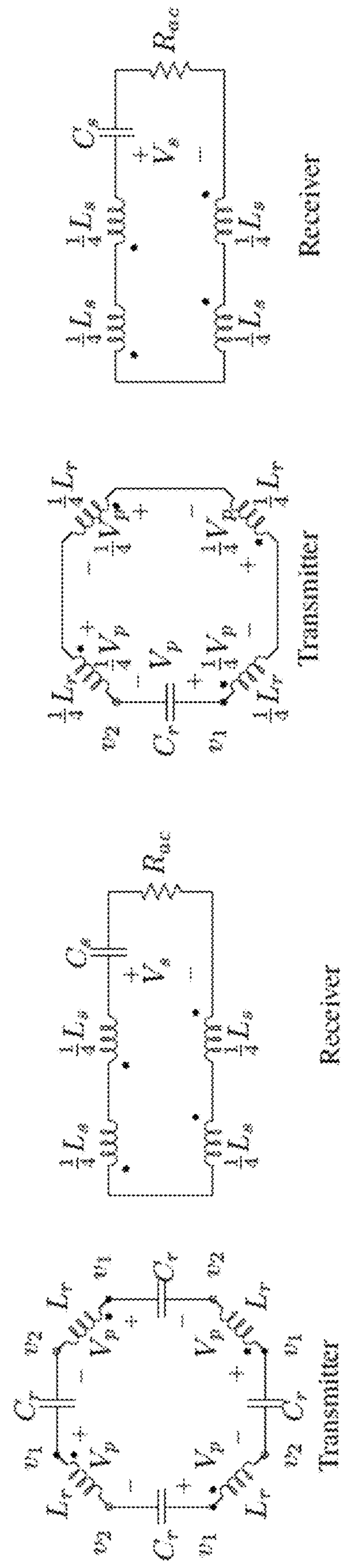
FIG. 9 depicts schematic views of wireless power transfer systems having an active segmented transmitter in accordance with one example and a singleton transmitter.
Figure 10:
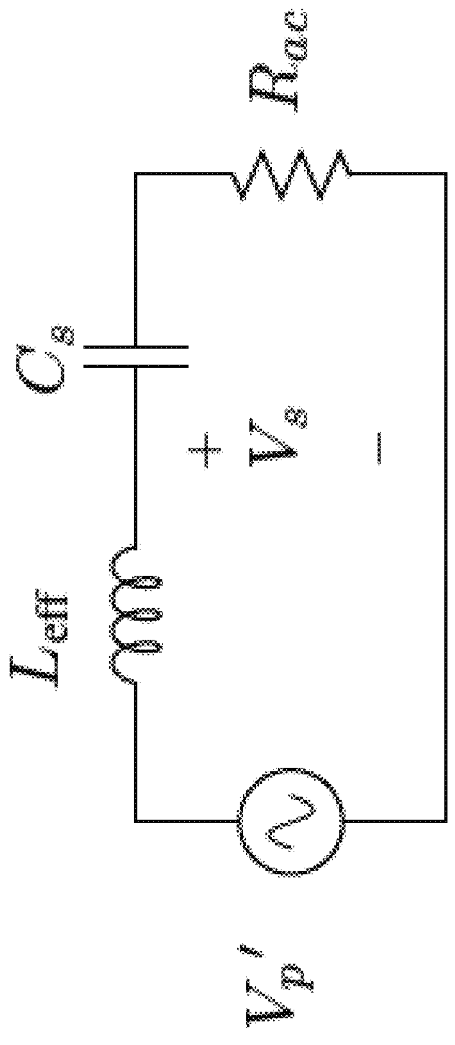
FIG. 10 is a schematic view of a receiver model of a wireless power transfer system in accordance with one example.

The active segmentation of the disclosed devices and systems is now compared with singleton and conventional segmented coil transmitters. For identical receivers, the performance is compared using different transmitters. Transmitter and wireless power transfer coils can be represented by a reflected voltage $V_{p'}$ and effective inductance $L_{eff}$ from the perspective of the receiver, as shown in FIG. 10. For convenience of analysis with uniformly coupled coils, the receiver inductance $L_s$ is decomposed into four equal parts each with ¼ $L_s$. The singleton transmitter inductance is decomposed similarly. These decompositions are illustrated in FIG. 9. For both the conventional and active segmented coil transmitters, shown in FIG. 9(*a*), $$V_p' = 4 \times k \sqrt{\frac{\frac{1}{4} L_s}{L_r}}\, V_p = 2k \sqrt{\frac{L_s}{L_r}}\, V_p, \tag{7}$$

while for singleton CMCD transmitter $$V_p' = 4 \times k \sqrt{\frac{\frac{1}{4} L_s}{\frac{1}{4} L_r}} \left(\frac{1}{4} V_p\right) = k \sqrt{\frac{L_s}{L_r}}\, V_p. \tag{8}$$

The effective inductance $$L_{eff} = 4 \times (1-k^2) \tfrac{1}{4} L_s = (1-k^2) L_s \tag{9}$$

is the same for both segmentation and singleton; $L_{eff}$ resonates with $C_s$. The output power is $$P = \frac{V_p'^2}{2R_{ac}}. \tag{10}$$

Because both conventional and active segmentation have twice the $V_{p'}$, the receiver has four times the power in comparison to the singleton for a given amount of switch voltage stress $V_p$.

For the current stress of the switches, which is represented by $I_{sw,rms}$, the conventional segmented coil transmitter has four times the stress compared with the switches in the active segmented CMCD transmitter because the same total power is extracted from only two switches instead of four sets of two switches. The device utilization of the active segmented CMCD transmitter is identical to that of the singleton CMCD transmitter. The performance comparison is summarized in Table I below.

TABLE I

ACTIVE SEGMENTED TRANSMITTER PERFORMANCE COMPARED WITH CONVENTIONAL SEGMENTED COIL. TRANSMITTER, SINGLETON TRANSMITTER AND THEIR VARIATIONS WITH PARALLELING SWITCHES

| Methods | Power | Switch Voltage Stress | Switch Current Stress | Maximum Frequency | Transfer Distance |
|---|---|---|---|---|---|
| Active Segmented Transmitter | P | $V_p$ | $I_{sw,rms}$ | $\omega_{max}$ | d |
| Singleton Transmitter | 0.25 P | $V_p$ | | $\omega_{max}$ | <d |
| Conventional Segmented Coil Transmitter | P | $V_p$ | 4 $I_{sw,rms}$ | $\omega_{max}$ | d |
| Singleton Transmitter with the 2 Parallel Switches | P | 2 $V_p$ | $I_{sw,rms}$ | 0.707 $\omega_{max}$ | <d |
| Conventional Segmented Coil Transmitter with the 4 Parallel Switches | P | $V_p$ | $I_{sw,rms}$ | 0.5 $\omega_{max}$ | |

The active segmentation of the disclosed devices and systems is now compared with singleton and conventional segmented coil transmitters with parallel switches. Compared to the active segmented CMCD transmitter with power P and switch current stress $I_{sw,rms}$, the singleton CMCD transmitter, shown in FIG. 6, has lower power (0.25 P) for the same device stress $V_p$ and $I_{sw,rms}$, whereas the conventional segmented coil transmitter, shown in FIG. 8, has four times the current stress ($4\,I_{sw,rms}$) in the switches for the same voltage stress $V_p$ and power P. Parallel switches can increase the power of a singleton CMCD transmitter while maintaining switch current stress and decreasing switch current stress in a conventional segmented coil WPT system while maintaining the power.

For a conventional segmented coil transmitter, four switches are disposed in parallel in each of the odd and even sides to share the current. For instance, S1 may include four parallel semiconductor switches and S2 may include another set of four parallel semiconductor switches. Thus, the switch utilization and the power can remain the same compared with the active segmented CMCD transmitter. However, when considering non-ideal switches with switch capacitance $C_{sw}$, the conventional segmented coil transmitter with parallel switches will have a lower maximum frequency compared to active segmentation. For the active segmented CMCD transmitter, the equivalent resonant capacitance is as follows.

$$C_{eq}=C_{r,active\ segmentation}+C_{sw}, \tag{11}$$

while for the conventional segmented coil transmitter $$C_{eq}=C_{r,conventional\ segmentation\ parallel}+4C_{sw} \tag{12}$$

For the limiting case, where $C_r=0$, the maximum frequency for active segmentation is $$\omega_{max,active\ segmentation}=\frac{1}{\sqrt{C_{sw}L_r}}; \tag{13}$$

the maximum frequency in a conventional segmented coil transmitter with four parallel switches is as follows.

$$\omega_{max,conventional\ segmentation\ parallel}=\frac{1}{\sqrt{4C_{sw}L_r}}. \tag{14}$$

For VHF power conversion, active segmentation is better for the power-frequency product compared to the conventional segmented coil with parallel switches.

For a singleton CMCD transmitter, the drain voltage is doubled for the same power P. The corresponding increased current requires an extra switch to maintain the current stress $I_{sw,rms}$. In this case, the maximum frequency is as follows.

$$\omega_{max,singleton\ parallel}=\frac{1}{\sqrt{2C_{sw}L_r}}. \tag{15}$$

The maximum frequency for the singleton CMCD transmitter with parallel switches is lower than active segmentation but higher than the conventional segmented coil transmitter with four parallel switches.

One important shortcoming of a singleton CMCD transmitter with parallel switches is that it will drive a smaller transmitter coil than both active and conventional segmentation for the same power. A smaller transmitter coil means a shorter transfer distance d for the same k, or a smaller k for the same transfer distance d. The performance is summarized in Table I.

The active segmented transmitter of the disclosed devices and systems has numerous advantages but includes more components and uses more control signals, likely increasing the cost and power loss. Among the four methods with identical power and identical receivers, losses from the choke inductor $L_c$, the transmitter coil, switch conduction, and switch $C_{oss}$ are taken into account. The singleton transmitter without parallel switches is also included for comparison. The results are summarized in Table II below. For simplicity, the effect of switch capacitances $C_{sw}$ on $I_{sw,rms}$, and hence switch conduction loss, is ignored.

TABLE II

ACTIVE SEGMENTED TRANSMITTER COMPONENT LOSS COMPARED WITH CONVENTIONAL SEGMENTED COIL TRANSMITTER, SINGLETON AND TRANSMITTER THEIR VARIATIONS WITH PARALLEL SWITCHES

| Methods | Power | Choke Loss | Primary Coil Loss | Switch Conduction Loss | Switch Coss Loss |
|---|---|---|---|---|---|
| Active Segmented Transmitter | P | $8 \times (\frac{1}{8}I_{dc})^2R_{choke}$ | $4\times\frac{I_{ac}^2}{2}R_{L_r}$ | $8\times I_{sw,rms}^2R_{ds,on}$ | $8\times\frac{1}{2}C_{oss}V_p^2$ |
| Conventional Segmented Coil Transmitter | P | $2 \times (\frac{1}{2}I_{dc})^2R_{choke}$ | $4\times\frac{I_{ac}^2}{2}R_{L_r}$ | $2 \times (4I_{sw,rms})^2R_{ds,on}$ | $2\times\frac{1}{2}C_{oss}V_p^2$ |
| Singleton Transmitter with the 2 Paralleled Switches | P | $2 \times (\frac{1}{2}\frac{1}{2}I_{dc})^2R_{choke}$ | $1\times\frac{(2I_{ac})^2}{2}R_{L_r}$ | $4\times I_{sw,rms}^2R_{ds,on}$ | $4 \times \frac{1}{2}C_{oss}(2V_p)^2$ |
| Conventional Segmented Coil Transmitter with the 4 Paralleled Switches | P | $2 \times (\frac{1}{2}I_{dc})^2R_{choke}$ | $4\times\frac{I_{ac}^2}{2}R_{L_r}$ | $8\times I_{sw,rms}^2R_{ds,on}$ | $8\times\frac{1}{2}C_{oss}V_p^2$ |
| Singleton Transmitter | $0.25 \times P$ | $2 \times (\frac{1}{2}0.25I_{dc})^2R_{choke}$ | $1\times\frac{I_{ac}^2}{2}R_{L_r}$ | $2\times I_{sw,rms}^2R_{ds,on}$ | $2\times\frac{1}{2}C_{oss}V_p^2$ |

According to the operating principles described above, the chokes share the dc current $I_{dc}$ with power loss as follows.

$$P_{choke} = n_c \times \left(\frac{1}{n_c} I_{dc}\right)^2 R_{choke}, \tag{16}$$

where $n_c$ is the number of the chokes used in each transmitter. The current $I_{dc}$ is identical for the active and conventional segmented coil transmitters and independent of parallel switching in segmentation, however halved for the singleton transmitter because the dc voltage is double for the same power.

For the transmitter coil loss, the inductance is assumed to have a quality factor of Q, making the ESR of $L_r$ as follows, and such that the transmitter coil loss is as follows.

$$R_{L_r} = \omega L_r / Q \tag{17}$$

$$P_{Tcoil} = n_{L_r} \times \frac{I_{ac}^2}{2} R_{L_r},$$

where $n_{Lr}$ is the number of segments. The transmitter coil current $I_{ac}$ is calculated as in expression (4), which doubles for the singleton transmitter with the same power.

The switch conduction loss is given by the following expression.

$$P_{sw,cond} = n_{sw} \times I_{sw,rms}{}^2 R_{ds,on} \tag{18}$$

The switch capacitance $C_{oss}$ is modeled as a complete loss as follows.

$$P_{sw,C_{oss}} = n_{sw} \times \frac{1}{2} C_{oss} V_p^2, \tag{19}$$

where $n_{sw}$ is the number of switches.

The receiver coil loss is as follows.

$$P_{Rcoil} = \frac{1}{2}\left(\frac{V_s}{\omega L_s}\right)^2 R_{L_s}, \tag{20}$$

where $V_s$ is the receiver coil peak voltage and $R_{Ls}=\omega L_s/Q$ is identical for identical receiver coils. This loss is identical for the same power P among different transmitters.

The singleton receiver loss will be one fourth of the expression (20) because the power is only one fourth at 0.25 P with the same $V_p$ at the transmitter. For the active segmented and singleton transmitters, illustrated in Table II, the power and loss are scaled by a factor of four, which means in comparison with the singleton, the active segmented wireless power transmitter has four times the power for the same efficiency with the same $V_p$.

Among the transmitters that can achieve the same transfer distance, the active segmented and conventional segmented transmitters with four parallel switches have the same coil loss and switch loss, but the active segmented transmitter has lower choke loss. Neglecting choke loss, there is a trade-off between switch conduction loss and switch Coss loss between an active segmented transmitter and a conventional segmented coil transmitter without parallel switches. Other comparisons can be posited from Table II.

Compared to the singleton, the conventional segmented coil transmitters, and their variants with parallel switches, active segmentation are useful in applications which involve high power, high efficiency, and long transfer distance with small receivers. Table I shows, that among the four methods with identical power, the active segmented transmitter has the least switch stress, maximum operating frequency, and the greatest transfer distance for the same coupling coefficient.

Additionally, compared to a singleton power converter, the loss and power are scalable in the active segmented power converter, which combines power from each primitive converter without changing the device stress. Every primitive module may share the load power equally and preserves efficiency. For implementation, active segmented transmitters may (or may not) have a symmetric layout and an identical design for the power and control circuits, ensuring matched timing and parasitics. A higher number of components does not necessarily mean loss of efficiency, as shown in Table II.

An example hardware implementation of a VHF active segmentation wireless power transfer system is now described, first with regard to the timing and sequence of the eight switches. It is challenging to obtain 100 MHz square waves with sharp rising and falling edges from most commercial function generators because of the bandwidth, especially with enough channels for eight synchronized control signals for the eight switches. FPGAs typically do not have enough frequency resolution. Thus, the control signal was generated using the following identical circuits. The signal source was a two-channel waveform generator (Keysight 33622A) configured to generate two out-of-phase sine waves. Two 1-to-4 power splitters expanded these channels to eight sinusoidal signals. Schmitt triggers were used to generate square waves with identical duty-ratios from biasing the multi-channel sinusoidal waves. These square waves were used as inputs to gate drivers that included logic inverters (e.g., SN74LVC2GU04).

Figure 11:
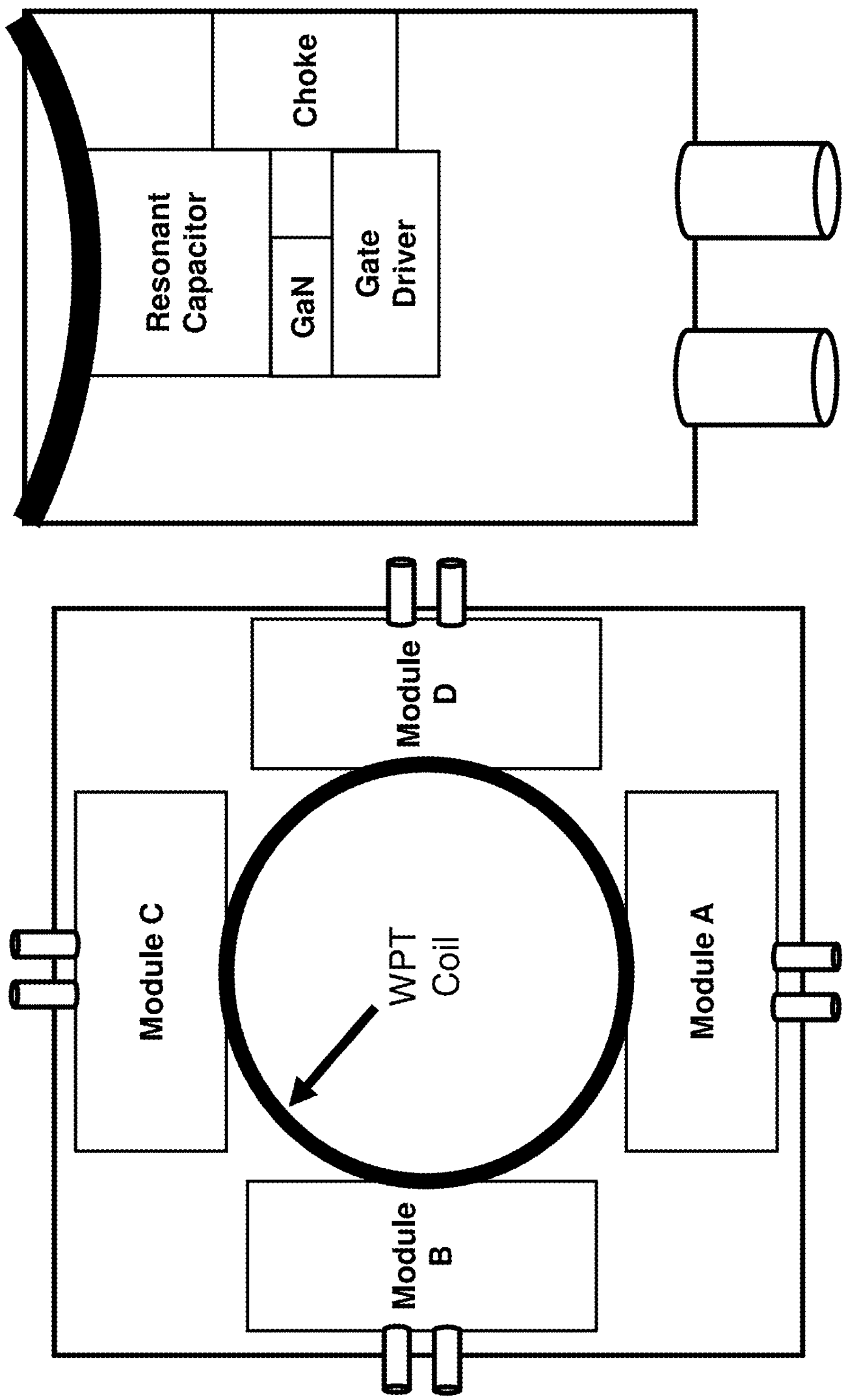
FIG. 11 depicts full and partial plan views of an active segmented current class D (CMCD) converter wireless power transfer device having active switches (e.g., HEMT devices) in accordance with one example.
Figure 12:
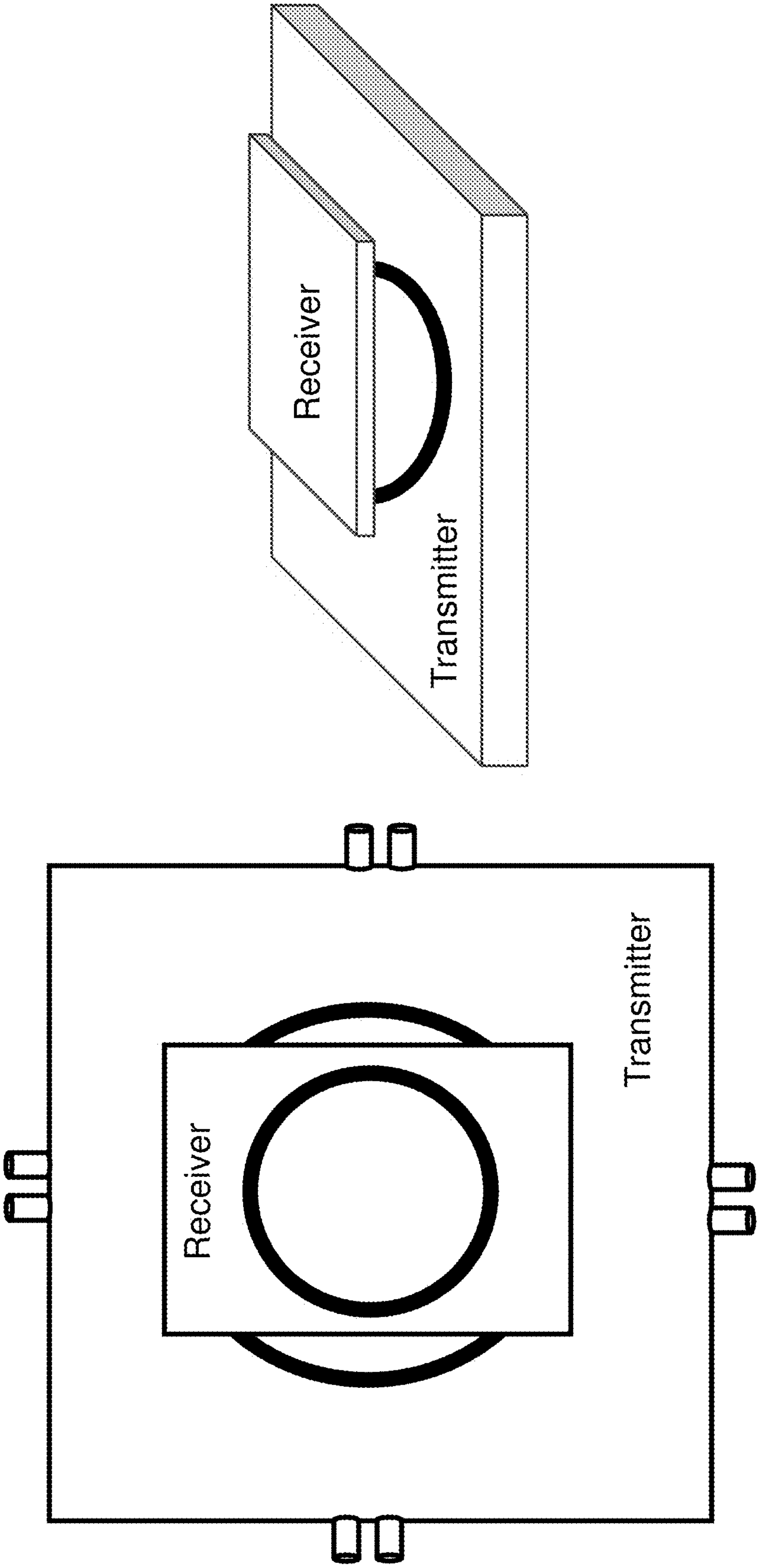
FIG. 12 depicts plan and side views of an active segmented wireless power transfer system in accordance with one example.

As previously mentioned, one of the useful aspects of VHF active segmented transmitter, in some cases, is the symmetric layout and identical design of the power and control circuits, ensuring matched timing and parasitics. The PCB layout of the active segmented CMCD transmitter and its CMCD primitive module is shown in FIG. 11. An EPC 2038 switch was used for the switches because of its small $C_{oss}$ (below 5 pF for all voltages) and small gate charge, which is used for VHF operation. The WPT coils in this case are two 4-layer FR4 PCB inductors. The load is a 20 a power resistor. Other components in this WPT implementation are shown in Table III.

TABLE III

IMPLEMENTATION OF ACTIVE SEGMENTED CMCD TRANSMITTER.

| Items | Components & Parameters |
|---|---|
| Choke Inductor | BCL-652JL 6.5 μH |
| Transmitter Resonant Capacitance | QUAD HIFREQ Series 27.6 pF |
| Receiver Resonant Capacitance | QUAD HIFREQ Series 11 pF |
| Transmitter PCB Coil | 297 nH (R = 6.3 cm) |
| Receiver PCB Coil | 180 nH (R = 3.8 cm) |
| Transfer Distance | 2.5 cm |
| DC Input Voltage | 18 V |

Figure 13:
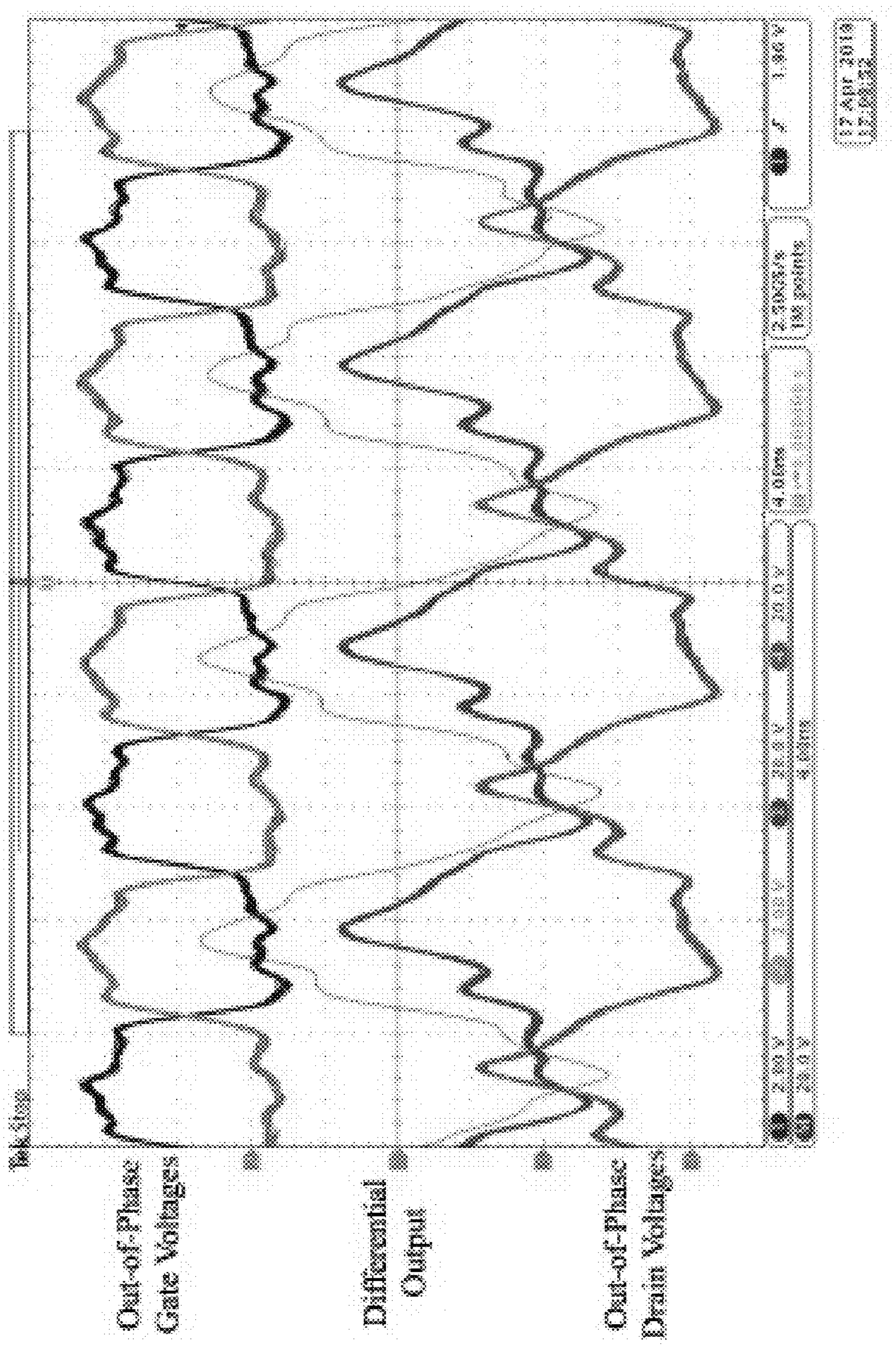
FIG. 13 depicts a graphical plot of waveforms of a primitive or constituent component, or CMCD module, of an active segmented wireless power transfer device in accordance with one example.

For an unloaded active segmented transmitter, the gate and drain voltage waveforms for one CMCD primitive module (e.g., Module A) are shown in FIG. 13, which is similar to a singleton CMCD converter in operation. The other three primitives had identical waveforms to Module A.

Figure 14:
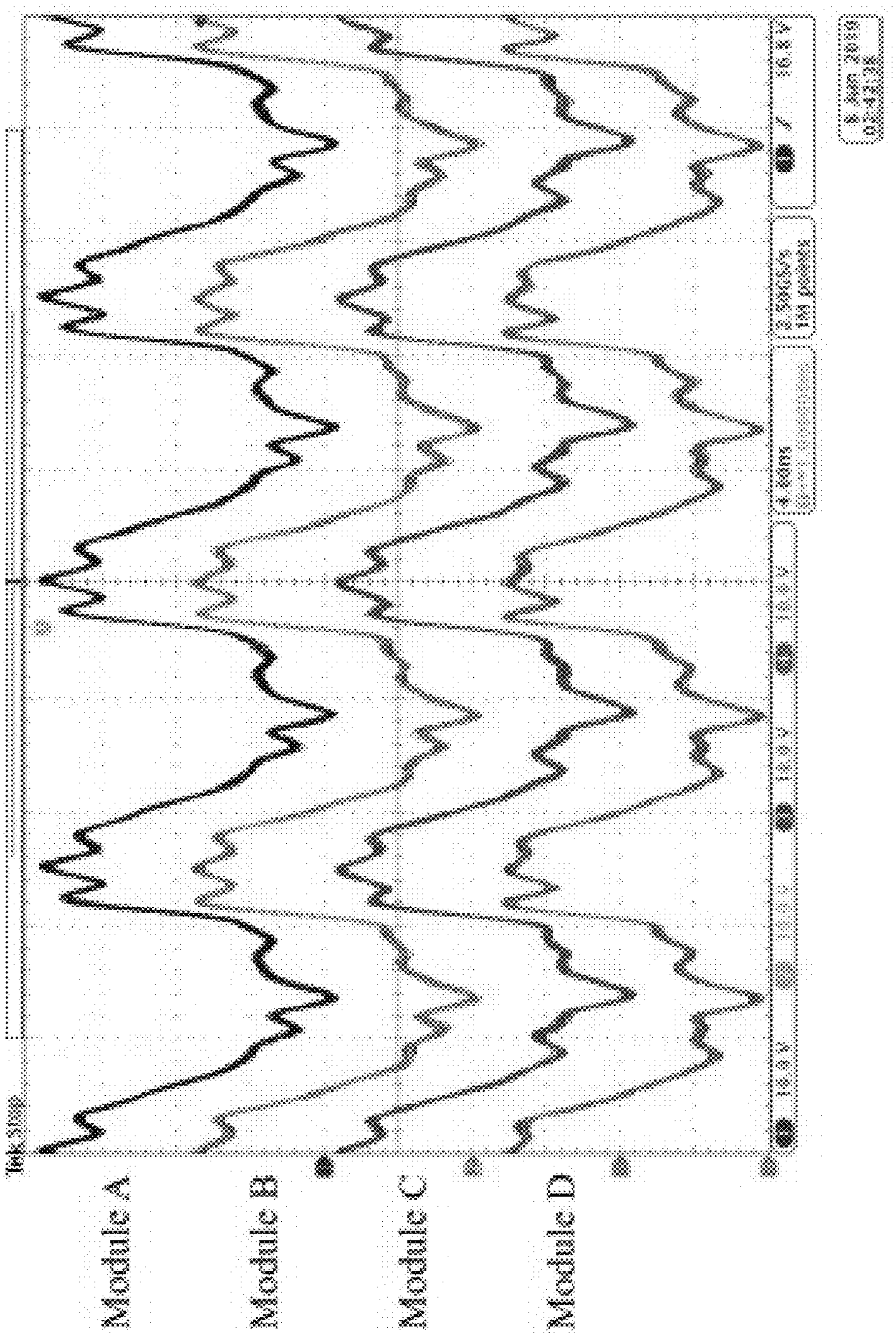
FIG. 14 depicts a graphical plot of drain voltages of switches (e.g., even switches) of four primitive or constituent components, or CMCD modules, of an active segmented wireless power transfer device with a 20Ω load in accordance with one example.
Figure 15:
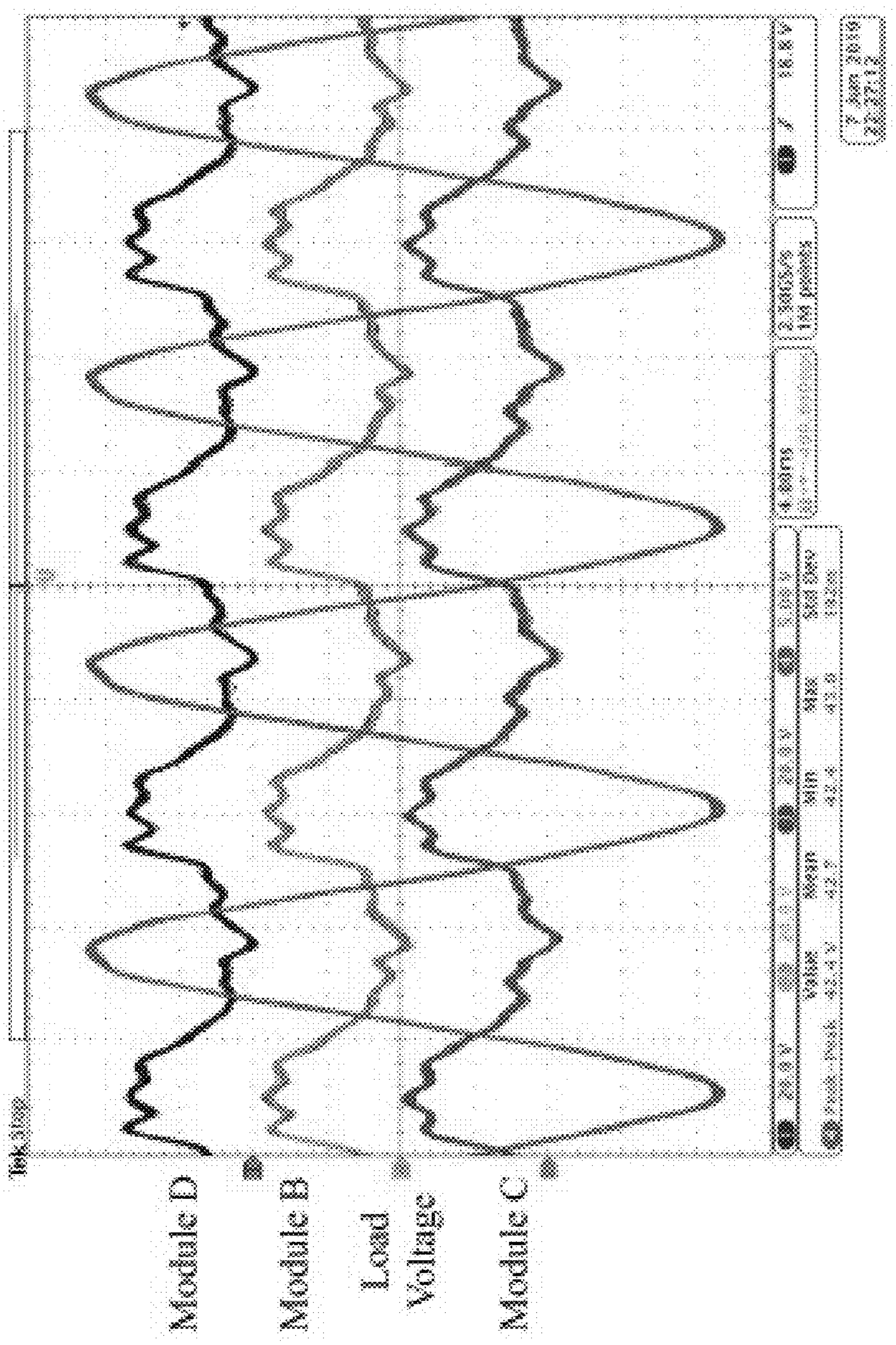
FIG. 15 depicts a graphical plot of output and drain voltages of switches (e.g., even switches) of four primitive or constituent components, or CMCD modules, of an active segmented wireless power transfer device with a 20Ω load in accordance with one example.

When loaded, the four drain voltages across the even switches and output load voltage were as shown in FIGS. 14 and 15, respectively. The drain voltages appear synchronized and similar with few variations. The output voltage is a sine wave, which is in phase with $V_p$ for a tuned series resonant network. The output power is 12 W with 81% efficiency. Considering the gating loss in the gate driver (1.3 W), the efficiency is approximately 74%.

Figure 16:
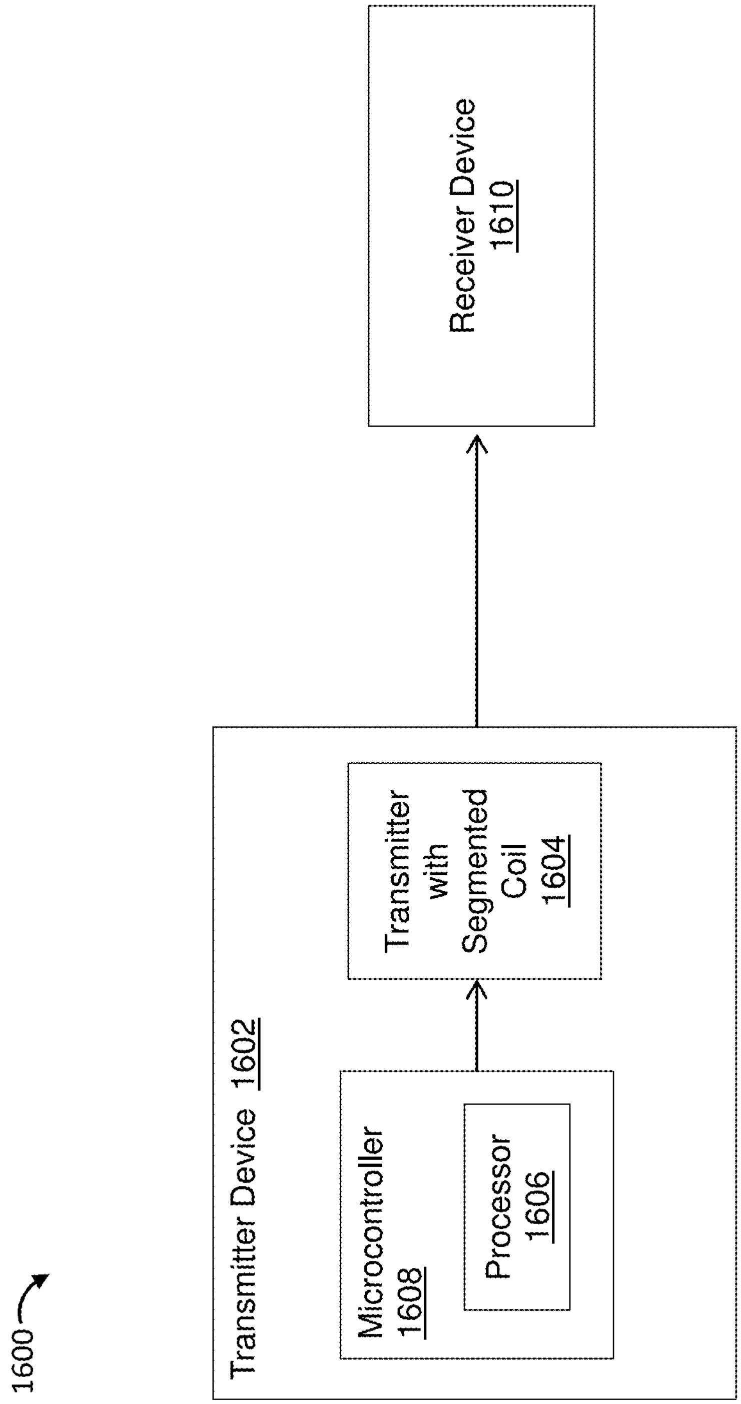
FIG. 16 is a block diagram of a wireless power transfer system having a transmitter with a segmented coil in accordance with one example.

FIG. 16 depicts a wireless power transfer system 1600 in accordance with one example having a transmitter device 1602 or sub-system that includes a transmitter 1604 configured for active segmented wireless power transfer as described herein. The transmitter 1604 thus includes a segmented coil and a plurality of constituent converters driving respective coil segments as described herein. Each adjacent pair of coil segments is separated by a respective passive element, as described herein. Each passive element may include a capacitance, an inductance, or any combination thereof, as described herein. The configuration of the capacitance(s) and/or inductance(s) may vary. For instance, one or more of the capacitances or inductances may be fixed or variable, switched, or modulated.

Any one or combination of the wireless power transfer devices described herein may be used.

The transmitter device 1602 also includes a processor 1606 configured to generate switch control signals for the switches of the transmitter 1604. In this example, the processor 1606 is a component of a microcontroller 1608.

The configuration of the processor 1606 may vary considerably from the example shown. Additional or alternative processors may be used in the transmitter device 1606. For instance, the processor 1606 may be provided by, configured as, or otherwise include a field programmable gate array (FPGA).

The switches of the transmitter 1604 may be or otherwise include active switches. For example, each active switch may be or otherwise include a transistor device, such as a HEMT device.

The system 1600 may include any number of transmitter devices 1602. The transmitter devices 1602 may be configured and/or operated similarly or dissimilarly.

The system 1600 includes one or more receiver devices 1610. In the example of FIG. 16, the system 1600 includes a single passive receiver device 1610. The receiver device 1610 may include any type of rectifier circuit coupled to a wireless power transfer coil, as described herein.

Additional or alternative receivers may be used. For instance, the receiver device 1610 may include a switched receiver or other active receiver. In some cases, the receiver device 1610 may be configured and operated with a segmented coil as described herein. In segmented coil cases, the switches of the receiver device 1610 may be active switches or passive switches.

Figure 17:
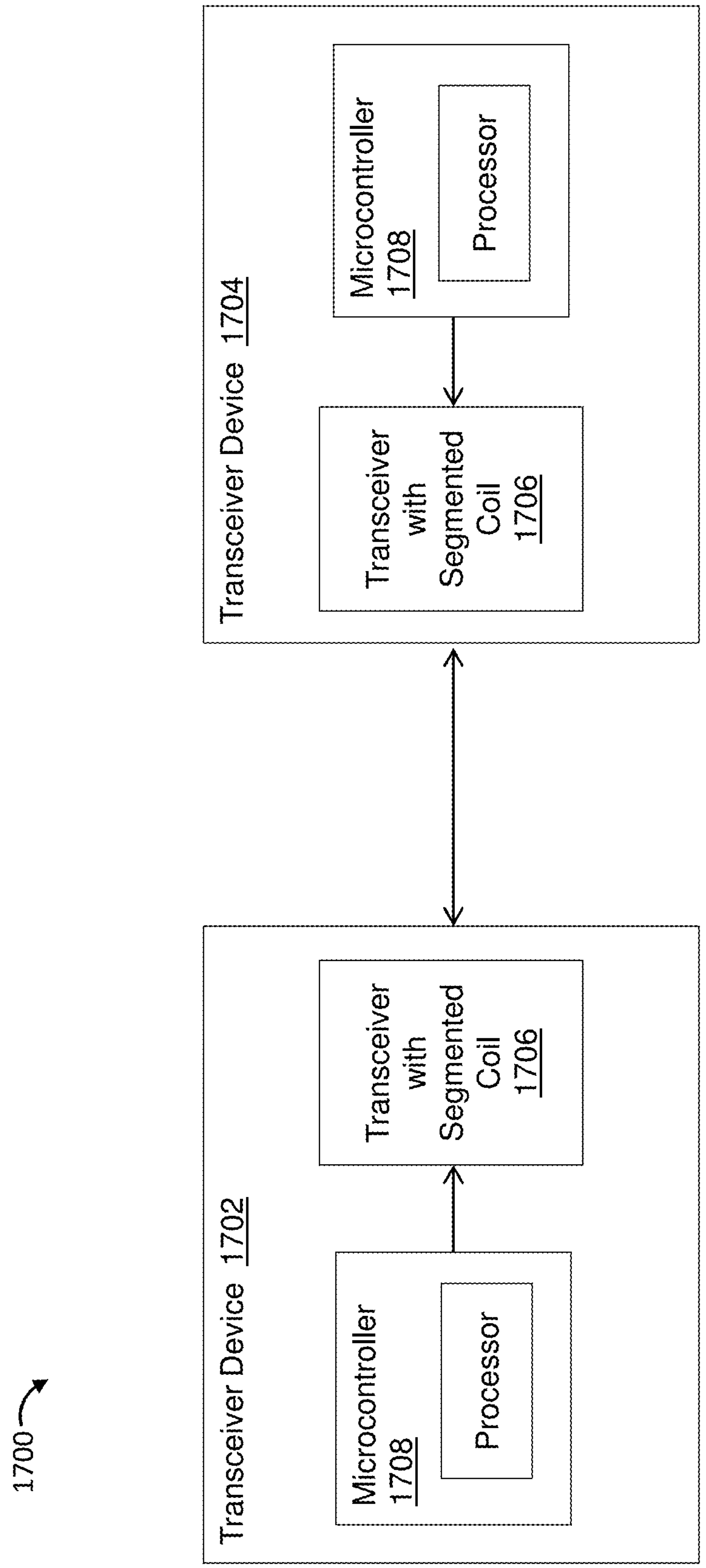
FIG. 17 is a block diagram of a wireless power transfer system having a pair of transceivers, each with a segmented coil, for bidirectional wireless power transfer in accordance with one example.

FIG. 17 depicts a wireless power transfer system 1700 in accordance with one example having multiple transceiver devices 1702, 1704 configured for active segmented wireless power transfer as described herein. In this example, the wireless power transfer system 1700 may be bidirectional. The direction of the wireless power transfer may be determined by the relative phase of the signals in the transceiver devices 1702, 1704, as described in the above-referenced patent publication.

Each transceiver device 1702, 1704 includes a transceiver 1706 with a segmented coil and a plurality of constituent converters driving respective coil segments as described herein. Each transceiver device 1702, 1704 further includes a microcontroller 1708 or other processor configured to generate the switch control signals for the constituent converters. The configuration of the processor 1710 may vary as described above.

Although described herein in connection with examples in which each coil segment is driven by a single constituent converter, the number of constituent converter need not equal the number of coil segments in the disclosed devices. For instance, the number of converters may be lower or greater than the number of coil segments. In the former case, one or more converters may be idled or not present for one or more of the coil segments. In the latter case, more than one converter may feed a respective passive segment (e.g., in parallel).

Figure 18:
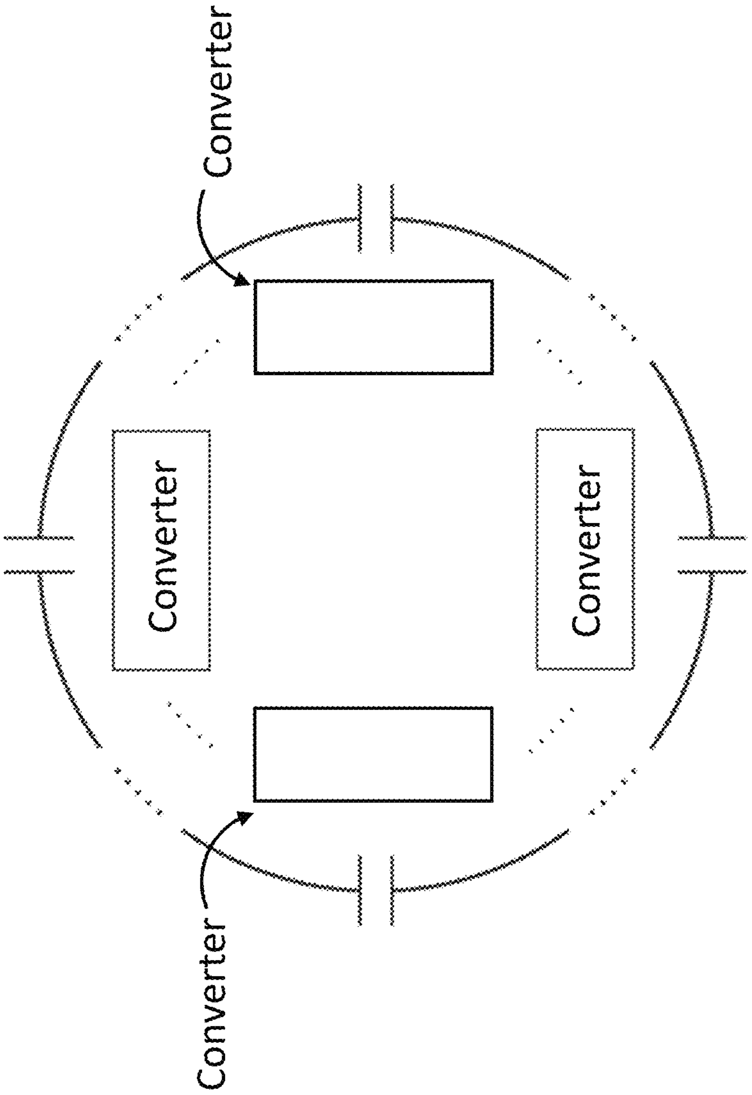
FIG. 18 is a schematic view of an active or passive segmented converter wireless power transfer device with constituent converters disposed inside, or within, a segmented coil in accordance with one example.

FIG. 18 depicts a segmented converter wireless power transfer device with constituent converters disposed inside, or within, a segmented coil in accordance with one example. The device may be configured similarly in several respects to the devices described above. For instance, the device includes a number of primitive or constituent converters disposed along a segmented coil. Each primitive or constituent converter of the device may be configured as described above. The device differs in that the constituent converters are disposed inside the segmented coil rather than outside.

The configuration of the converters may vary as described herein. For instance, one or more of the converters may be active or passive. Each active converter may be or otherwise include an active device, such as a HEMT device, as described above. Each passive converter may be or otherwise include a passive device, such as a diode.

FIG. 19 depicts a passive segmented converter wireless power transfer device in accordance with an example. In this case, each of the constituent converters includes a diode as a passive switching device. Other aspects of the device may be similar to one or more of the other examples described herein.

The passive segmented converter wireless power transfer device of FIG. 19 may be used as a receiver in a wireless power transfer system. For instance, the device may be incorporated into the system of FIG. 16, or another system.

The passive devices described herein may also be used on the receiver side of a wireless power transfer system. For instance, a receiver device may include a passive segmented CMCD power rectifier configured in accordance with the example shown in FIG. 19.

In some cases, the segmented transmitters described above may behave as active segmented transceivers and hence can be considered as active segmented transceivers. For instance, a phase shift in the active segmented transceiver current relative to another active transceiver (may be segmented or not segmented) determines the direction of the power flow. In other words, one may be the transmitter or receiver, and the other one the receiver or transmitter, respectively. The transmitter and/or receiver may be configured for passive segmentation in other cases.

Described above are devices and systems that provide wireless power transfer with active or passive segmentation. In some cases, VHF active segmentation may be used to increase the transfer distance of a large transmitter with a smaller receiver while preserving power and efficiency. In one example, an active segmented power converter operates with identical and synchronized primitive converters. An example of a wireless power transfer system with an active segmented transmitter and a series resonant receiver demonstrated active segmentation in hardware for 100 MHz wireless power transfer at 12 W and 74% efficiency.

The implementation of the active segmentation may vary from the examples described above. For instance, only a subset of the segments of the inductor may be driven actively in some cases.

The present disclosure has been described with reference to specific examples that are intended to be illustrative only and not to be limiting of the disclosure. Changes, additions and/or deletions may be made to the examples without departing from the spirit and scope of the disclosure.

The foregoing description is given for clearness of understanding only, and no unnecessary limitations should be understood therefrom.

What is claimed is:

1. A device for wireless power transfer, the device comprising:

a segmented coil comprising a plurality of resonant coil segments, each adjacent pair of resonant coil segments of the plurality of resonant coil segments being separated from, and coupled to, one another by a respective passive element; and a plurality of constituent converters coupled to the segmented coil, each constituent converter of the plurality of constituent converters being coupled to a respective resonant coil segment of the plurality of resonant coil segments, each constituent converter of the plurality of constituent converters being configured to drive the respective resonant coil segment to transmit or receive power for the wireless power transfer such that power conversion by the plurality of constituent converters is segmented;

wherein the plurality of coil segments are arranged in a loop;

wherein each resonant coil segment of the plurality of resonant coil segments has a respective constituent converter of the plurality of constituent converters coupled thereto; and wherein each constituent converter of the plurality of constituent converters is configured to drive the respective resonant coil segment to which the constituent converter is coupled such that a same loop current flows through each respective resonant coil segment of the plurality of resonant coil segments.

2. The device of claim 1, wherein each passive element comprises a capacitance.

3. The device of claim 1, where each passive element comprises an inductance.

4. The device of claim 1, where each passive element comprises a combination of capacitances and inductances.

5. The device of claim 1, wherein each constituent converter of the plurality of converters is configured as a current-mode, Class D converter.

6. The device of claim 1, wherein each resonant coil segment of the plurality of resonant coil segments is driven by a respective constituent converter of the plurality of constituent converters.

7. The device of claim 1, wherein the plurality of constituent converters have an identical configuration.

8. The device of claim 1, wherein the plurality of constituent converters are controlled to provide an equal amount of power to the segmented coil.

9. The device of claim 1, wherein the plurality of constituent converters are controlled to provide different amounts of power to the segmented coil to spatially shape/direct the wireless power transfer.

10. The device of claim 1, wherein the plurality of constituent converters are controlled to provide different phase angle of power to the segmented coil to spatially shape and/or direct the wireless power transfer.

11. The device of claim 1, wherein:

each constituent converter of the plurality of converters comprises a plurality of switches and a plurality of passive components coupling the plurality of switches to the resonant coil segment; and each switch of the plurality of switches is ground-referenced.

12. The device of claim 11, wherein:

the plurality of switches comprises a first switch and a second switch; and the first switch and the second switch are controlled by complementary switch control signals.

13. The device of claim 11, wherein each switch of the plurality of switches comprises a high electron mobility transistor (HEMT).

14. The device of claim 11, wherein the plurality of passive components and the respective capacitance are configured to act as a filter such that the segmented coil is driven at a frequency of the wireless power transfer.

15. The device of claim 11, wherein the plurality of passive components comprises a plurality of choke inductors, each choke inductor of the plurality of choke inductors acting as a switched current source with a respective switch of the plurality of switches.

16. A system for wireless power transfer, the system comprising:

a transmitter device; and a receiver device;

wherein the transmitter device, the receiver device, or both the transmitter device and the receiver device comprises:

a segmented coil comprising a plurality of resonant coil segments, each adjacent pair of resonant coil segments of the plurality of resonant coil segments being separated from, and coupled to, one another by a respective capacitance; and a plurality of constituent converters coupled to the segmented coil, each constituent converter of the plurality of constituent converters being coupled to a respective resonant coil segment of the plurality of resonant coil segments, each constituent converter of the plurality of constituent converters being configured to drive the respective resonant coil segment to transmit or receive power for the wireless power transfer such that power conversion by the plurality of constituent converters is segmented;

wherein the plurality of coil segments are arranged in a loop;

wherein each resonant coil segment of the plurality of resonant coil segments has a respective constituent converter of the plurality of constituent converters coupled thereto; and wherein each constituent converter of the plurality of constituent converters is configured to drive the respective resonant coil segment to which the constituent converter is coupled such that a same loop current flows through each respective resonant coil segment of the plurality of resonant coil segments.

17. The system of claim 16, wherein each constituent converter of the plurality of converters is configured as a current-mode, Class D converter.

18. The system of claim 16, wherein each resonant coil segment of the plurality of resonant coil segments is driven by a respective constituent converter of the plurality of constituent converters.

19. The system of claim 16, wherein:

each constituent converter of the plurality of converters comprises a plurality of switches and a plurality of passive components coupling the plurality of switches to the resonant coil segment; and each switch of the plurality of switches is ground-referenced.

20. The system of claim 16, wherein:

the plurality of switches comprises a first switch and a second switch; and the first switch and the second switch are controlled by complementary switch control signals.

21. A transmitter for wireless power transfer, the transmitter comprising:

a segmented coil comprising a plurality of resonant coil segments, each adjacent pair of resonant coil segments of the plurality of resonant coil segments being separated from, and coupled to, one another by a respective capacitance; and a plurality of constituent converters coupled to the segmented coil, each constituent converter of the plurality of constituent converters being coupled to a respective resonant coil segment of the plurality of resonant coil segments, each constituent converter of the plurality of constituent converters being configured to drive the respective resonant coil segment to transmit power for the wireless power transfer such that power conversion by the plurality of constituent converters is segmented;

wherein:

each constituent converter of the plurality of converters comprises a pair of switches and a plurality of passive components coupling the pair of switches to the resonant coil segment;

the plurality of coil segments are arranged in a loop;

wherein each resonant coil segment of the plurality of resonant coil segments has a respective constituent converter of the plurality of constituent converters coupled thereto; and wherein each constituent converter of the plurality of constituent converters is configured to drive the respective resonant coil segment to which the constituent converter is coupled such that a same loop current flows through each respective resonant coil segment of the plurality of resonant coil segments.

22. The transmitter of claim 21, wherein the pair of switches are controlled by complementary switch control signals.

23. The transmitter of claim 21, wherein each constituent converter of the plurality of converters is configured as a current-mode, Class D converter.

24. The transmitter of claim 21, wherein each resonant coil segment of the plurality of resonant coil segments is driven by a respective constituent converter of the plurality of constituent converters.

25. A receiver for wireless power transfer, the receiver comprising:

a segmented coil comprising a plurality of resonant coil segments, each adjacent pair of resonant coil segments of the plurality of resonant coil segments being separated from, and coupled to, one another by a respective capacitance; and a plurality of constituent converters coupled to the segmented coil, each constituent converter of the plurality of constituent converters being coupled to a respective resonant coil segment of the plurality of resonant coil segments, each constituent converter of the plurality of constituent converters being configured to drive the respective resonant coil segment to receive power for the wireless power transfer such that power conversion by the plurality of constituent converters is segmented;

wherein:

each constituent converter of the plurality of converters comprises a pair of switches and a plurality of passive components coupling the pair of switches to the resonant coil segment;

the plurality of resonant coil segments are arranged in a loop;

wherein each resonant coil segment of the plurality of resonant coil segments has a respective constituent converter of the plurality of constituent converters coupled thereto; and wherein each constituent converter of the plurality of constituent converters is configured to drive the respective resonant coil segment to which the constituent converter is coupled such that a same loop current flows through each respective resonant coil segment of the plurality of resonant coil segments.

26. The receiver of claim 25, wherein the pair of switches are controlled by complementary switch control signals.

27. The receiver of claim 25, wherein each constituent converter of the plurality of converters is configured as a current-mode, Class D converter.

28. The receiver of claim 25, wherein each resonant coil segment of the plurality of resonant coil segments is driven by a respective constituent converter of the plurality of constituent converters.

* * * * *